(12) United States Patent
Mackellar et al.

(10) Patent No.: US 12,502,129 B2
(45) Date of Patent: Dec. 23, 2025

(54) METHOD AND SYSTEM FOR COLLECTING AND PROCESSING BIOELECTRICAL SIGNALS

(71) Applicant: Emotiv Inc., San Francisco, CA (US)

(72) Inventors: Geoffrey Ross Mackellar, Sydney (AU); Tan Le, San Francisco, CA (US)

(73) Assignee: Emotiv Inc., San Francisco, CA (US)

( * ) Notice: Subject to any disclaimer, the term of this patent is extended or adjusted under 35 U.S.C. 154(b) by 0 days.

(21) Appl. No.: 18/375,201

(22) Filed: Sep. 29, 2023

(65) Prior Publication Data

US 2024/0023892 A1 Jan. 25, 2024

Related U.S. Application Data

(63) Continuation of application No. 16/390,881, filed on Apr. 22, 2019, now abandoned, which is a
(Continued)

(51) Int. Cl.
*A61B 5/00* (2006.01)
*A61B 5/024* (2006.01)
(Continued)

(52) U.S. Cl.
CPC ........ *A61B 5/6817* (2013.01); *A61B 5/02405* (2013.01); *A61B 5/0245* (2013.01); *A61B 5/291* (2021.01); *A61B 5/316* (2021.01); *A61B 5/7203* (2013.01); *A61M 21/00* (2013.01); *H04R 1/1016* (2013.01); *H04R 1/1041* (2013.01); *A61M 2021/0027* (2013.01); *A61M 2230/10* (2013.01)

(58) Field of Classification Search
None
See application file for complete search history.

(56) References Cited

U.S. PATENT DOCUMENTS 4,421,122 A 12/1983 Duffy
5,287,859 A 2/1994 John
(Continued)

FOREIGN PATENT DOCUMENTS

JP 2014215963 A 11/2014
WO 2004047636 A1 6/2004
(Continued)

OTHER PUBLICATIONS

Davis, Gene, et al., "Soft, Embeddable, Dry EEG Sensors for Real World Applications", 12th European Conference on Computer Vision, ECCV 2012; [Lecture notes in Computer Science], pp. 269-278, XP047544849.
Park, Jeong-Hyeon, et al., "Multiscale Entropy Analysis of EEG from Patients Under Different Pathological Conditions", Fractais 15, 399 (2007). Fractals vol. 15, No. 4 (2007) 399-404.
(Continued)

*Primary Examiner* — Etsub D Berhanu
(74) *Attorney, Agent, or Firm* — Jeffrey Schox; Annie Imbrie-Moore

(57) ABSTRACT

A method and system for detecting bioelectrical signals from a user, including establishing bioelectrical contact between a user and one or more sensors of a biomonitoring neuroheadset; collecting one or more reference signal datasets; collecting, at the one or more sensors, one or more bioelectrical signal datasets referenced to a combined reference signal dataset; and extracting one or more bioparameters from the one or more bioelectrical signal datasets.

10 Claims, 13 Drawing Sheets

Related U.S. Application Data continuation-in-part of application No. 15/209,582, filed on Jul. 13, 2016, now Pat. No. 10,291,977.

(60) Provisional application No. 62/660,853, filed on Apr. 20, 2018, provisional application No. 62/201,256, filed on Aug. 5, 2015.

(51) Int. Cl.

| | | |
|---|---|---|
| *A61B 5/0245* | (2006.01) | |
| *A61B 5/291* | (2021.01) | |
| *A61B 5/316* | (2021.01) | |
| *A61B 5/369* | (2021.01) | |
| *A61M 21/00* | (2006.01) | |
| *H04R 1/10* | (2006.01) | |

(56) References Cited

U.S. PATENT DOCUMENTS

| | | |
|---|---|---|
| 6,201,982 B1 | 3/2001 | Menkes et al. |
| 6,230,049 B1 | 5/2001 | Fischell et al. |
| 6,801,803 B2 | 10/2004 | Viertoe-Oja |
| 6,954,700 B2 | 10/2005 | Higashida et al. |
| 7,639,145 B2 | 12/2009 | Lawson et al. |
| 7,764,311 B2 | 7/2010 | Bill |
| 7,844,324 B2 | 11/2010 | Saerkelae et al. |
| 7,904,144 B2 | 3/2011 | Causevic et al. |
| 7,933,644 B2 | 4/2011 | Wong et al. |
| 7,962,204 B2 | 6/2011 | Suffin et al. |
| 7,986,991 B2 | 7/2011 | Prichep |
| 8,103,333 B2 | 1/2012 | Tran |
| 8,108,036 B2 | 1/2012 | Tran |
| 8,114,021 B2 | 2/2012 | Robertson et al. |
| 8,137,270 B2 | 3/2012 | Keenan et al. |
| 8,147,419 B2 | 4/2012 | Krauss et al. |
| 8,190,248 B2 | 5/2012 | Besio et al. |
| 8,190,249 B1 | 5/2012 | Gharieb et al. |
| 8,271,075 B2 | 9/2012 | Chuang et al. |
| 8,306,610 B2 | 11/2012 | Mirow |
| 8,583,223 B2 | 11/2013 | Maddess et al. |
| 8,652,040 B2 | 2/2014 | Leboeuf et al. |
| 8,688,209 B2 | 4/2014 | Verbitskiy |
| 8,690,769 B2 | 4/2014 | Edman et al. |
| 8,725,243 B2 | 5/2014 | Dilorenzo et al. |
| 8,838,215 B2 | 9/2014 | John et al. |
| 9,179,854 B2 | 11/2015 | Doidge et al. |
| 9,521,960 B2 | 12/2016 | Lee et al. |
| 9,867,548 B2 | 1/2018 | Le et al. |
| 10,028,703 B2 | 7/2018 | Le et al. |
| 10,108,264 B2 | 10/2018 | Le et al. |
| 10,291,977 B2 | 5/2019 | Mackellar et al. |
| 2001/0049480 A1 | 12/2001 | John et al. |
| 2002/0029005 A1 | 3/2002 | Levendowski et al. |
| 2002/0077560 A1 | 6/2002 | Kramer et al. |
| 2003/0055355 A1 | 3/2003 | Viertiö-Oja |
| 2003/0181795 A1 | 9/2003 | Suzuki et al. |
| 2004/0012410 A1 | 1/2004 | Liu et al. |
| 2004/0078219 A1 | 4/2004 | Kaylor et al. |
| 2004/0137639 A1 | 7/2004 | Miyazaki et al. |
| 2004/0152957 A1 | 8/2004 | Stivoric et al. |
| 2004/0236240 A1 | 11/2004 | Kraus et al. |
| 2004/0249249 A1 | 12/2004 | Lawson et al. |
| 2005/0107723 A1 | 5/2005 | Wehman et al. |
| 2005/0234329 A1 | 10/2005 | Kraus et al. |
| 2005/0240087 A1 | 10/2005 | Keenan et al. |
| 2005/0277826 A1 | 12/2005 | Dunseath |
| 2005/0283053 A1 | 12/2005 | Decharms |
| 2005/0288954 A1 | 12/2005 | Mccarthy et al. |
| 2006/0009697 A1 | 1/2006 | Banet et al. |
| 2006/0015034 A1 | 1/2006 | Martinerie et al. |
| 2006/0063980 A1 | 3/2006 | Hwang et al. |
| 2006/0143647 A1 | 6/2006 | Bill |
| 2006/0173510 A1 | 8/2006 | Besio et al. |
| 2006/0293921 A1 | 12/2006 | Mccarthy et al. |
| 2007/0032737 A1 | 2/2007 | Causevic et al. |
| 2007/0033634 A1 | 2/2007 | Leurs et al. |
| 2007/0060831 A1 | 3/2007 | Le et al. |
| 2007/0061735 A1 | 3/2007 | Hoffberg et al. |
| 2007/0100246 A1 | 5/2007 | Hyde |
| 2007/0113725 A1 | 5/2007 | Oliver et al. |
| 2007/0150025 A1 | 6/2007 | Dilorenzo et al. |
| 2007/0173733 A1 | 7/2007 | Le et al. |
| 2007/0191727 A1 | 8/2007 | Fadem |
| 2007/0208263 A1 | 9/2007 | John et al. |
| 2007/0219455 A1 | 9/2007 | Wong et al. |
| 2007/0225585 A1 | 9/2007 | Washbon et al. |
| 2008/0027345 A1 | 1/2008 | Kumada et al. |
| 2008/0103368 A1 | 5/2008 | Craine et al. |
| 2008/0108908 A1 | 5/2008 | Maddess et al. |
| 2008/0146890 A1 | 6/2008 | Leboeuf et al. |
| 2008/0177197 A1 | 7/2008 | Lee et al. |
| 2008/0194981 A1 | 8/2008 | Sarkela et al. |
| 2008/0242946 A1 | 10/2008 | Krachman |
| 2008/0294062 A1 | 11/2008 | Rapoport et al. |
| 2008/0306895 A1 | 12/2008 | Karty |
| 2009/0018405 A1 | 1/2009 | Katsumura et al. |
| 2009/0024050 A1 | 1/2009 | Jung et al. |
| 2009/0062676 A1 | 3/2009 | Kruglikov et al. |
| 2009/0079607 A1 | 3/2009 | Denison et al. |
| 2009/0083129 A1 | 3/2009 | Pradeep et al. |
| 2009/0105576 A1 | 4/2009 | Do et al. |
| 2009/0131764 A1 | 5/2009 | Lee et al. |
| 2009/0137923 A1 | 5/2009 | Suffin et al. |
| 2009/0163781 A1 | 6/2009 | Say et al. |
| 2009/0163784 A1 | 6/2009 | Sarpeshkar et al. |
| 2009/0214060 A1 | 8/2009 | Chuang et al. |
| 2009/0227876 A1 | 9/2009 | Tran |
| 2009/0247894 A1 | 10/2009 | Causevic |
| 2009/0259137 A1 | 10/2009 | Delic et al. |
| 2009/0292180 A1 | 11/2009 | Mirow |
| 2009/0318779 A1 | 12/2009 | Tran |
| 2009/0318825 A1 | 12/2009 | Kilborn |
| 2010/0004977 A1 | 1/2010 | Marci et al. |
| 2010/0010336 A1 | 1/2010 | Pettegrew et al. |
| 2010/0010364 A1 | 1/2010 | Verbitskiy |
| 2010/0022820 A1 | 1/2010 | Leuthardt et al. |
| 2010/0022907 A1 | 1/2010 | Perez-Velazquez et al. |
| 2010/0042011 A1 | 2/2010 | Doidge et al. |
| 2010/0049004 A1 | 2/2010 | Edman et al. |
| 2010/0069735 A1 | 3/2010 | Berkner |
| 2010/0094155 A1 | 4/2010 | Prichep |
| 2010/0121572 A1 | 5/2010 | Berardi et al. |
| 2010/0147913 A1 | 6/2010 | Corets |
| 2010/0169409 A1 | 7/2010 | Fallon et al. |
| 2010/0172522 A1 | 7/2010 | Mooring et al. |
| 2010/0217100 A1 | 8/2010 | Leboeuf et al. |
| 2010/0286549 A1 | 11/2010 | John et al. |
| 2010/0312188 A1 | 12/2010 | Robertson et al. |
| 2011/0046502 A1 | 2/2011 | Pradeep et al. |
| 2011/0071364 A1 | 3/2011 | Kuo et al. |
| 2011/0087125 A1 | 4/2011 | Causevic |
| 2011/0098112 A1 | 4/2011 | Leboeuf et al. |
| 2011/0172553 A1 | 7/2011 | John |
| 2011/0184247 A1 | 7/2011 | Contant et al. |
| 2011/0196211 A1 | 8/2011 | Al-Ali et al. |
| 2011/0201904 A1 | 8/2011 | Cusimano et al. |
| 2011/0245633 A1 | 10/2011 | Goldberg et al. |
| 2011/0257502 A1 | 10/2011 | Lee |
| 2011/0270117 A1 | 11/2011 | Warwick et al. |
| 2011/0282232 A1 | 11/2011 | Pradeep et al. |
| 2012/0101396 A1 | 4/2012 | Solosko et al. |
| 2012/0116176 A1 | 5/2012 | Moravec et al. |
| 2012/0156933 A1 | 6/2012 | Kreger et al. |
| 2012/0197153 A1 | 8/2012 | Kraus et al. |
| 2012/0330114 A1 | 12/2012 | Cheung et al. |
| 2013/0035579 A1 | 2/2013 | Le et al. |
| 2013/0150686 A1 | 6/2013 | Fronterhouse et al. |
| 2013/0178731 A1 | 7/2013 | Bosl |
| 2013/0317384 A1 | 11/2013 | Le |
| 2014/0038147 A1 | 2/2014 | Morrow |
| 2014/0148657 A1 | 5/2014 | Hendler et al. |
| 2014/0171775 A1 | 6/2014 | Kilsgaard et al. |

(56) References Cited

U.S. PATENT DOCUMENTS

| | | |
|---|---|---|
| 2014/0223462 A1 | 8/2014 | Aimone et al. |
| 2014/0257073 A1 | 9/2014 | Machon et al. |
| 2014/0316230 A1 | 10/2014 | Denison et al. |
| 2014/0336473 A1 | 11/2014 | Greco |
| 2015/0150753 A1 | 6/2015 | Racette |
| 2015/0216437 A1 | 8/2015 | Mihajlovic |
| 2015/0216439 A1 | 8/2015 | Muraskin et al. |
| 2015/0297109 A1 | 10/2015 | Garten et al. |
| 2015/0327815 A1 * | 11/2015 | Hwang ............... A61B 5/7225 600/547 |
| 2015/0351655 A1 | 12/2015 | Coleman |
| 2016/0029958 A1 | 2/2016 | Le et al. |
| 2016/0270718 A1 | 9/2016 | Heneghan et al. |
| 2016/0286287 A1 | 9/2016 | Slack |
| 2017/0027466 A1 | 2/2017 | Kerth et al. |
| 2017/0041264 A1 | 2/2017 | Khomami Abadi et al. |
| 2017/0319132 A1 | 11/2017 | Longinotti-Buitoni et al. |
| 2019/0113973 A1 | 4/2019 | Coleman et al. |
| 2023/0225659 A1 | 7/2023 | Azemi et al. |

FOREIGN PATENT DOCUMENTS

| | | |
|---|---|---|
| WO | 2009087486 A2 | 7/2009 |
| WO | 2010147913 A1 | 12/2010 |
| WO | 2014150684 A1 | 9/2014 |
| WO | 2016070188 A1 | 5/2016 |

OTHER PUBLICATIONS

Srinivasan, Jayarman, et al., "Heart Rate Calculation from Ensemble Brain Wave Using Wavelet and Teager-Kaiser Energy Operator", IEEE (2015).

Stam, Cornelius J., et al., "Nonlinear Synchronization in EEG and Whole-Head MEG Recordings of Healthy Subjects", Hum Brain Mapp. Jun. 2003; 19(2): 63-78, published Mar. 12, 2003.

Warchall, Julian, "A Multi-Channel EEG System Featuring Single-Wire Data Aggregation via FM-FDM Techniques", IEEE International Symposium on Circuits and Systems (ISCAS), May 22-25, 2016. (Year: 2016).

* cited by examiner

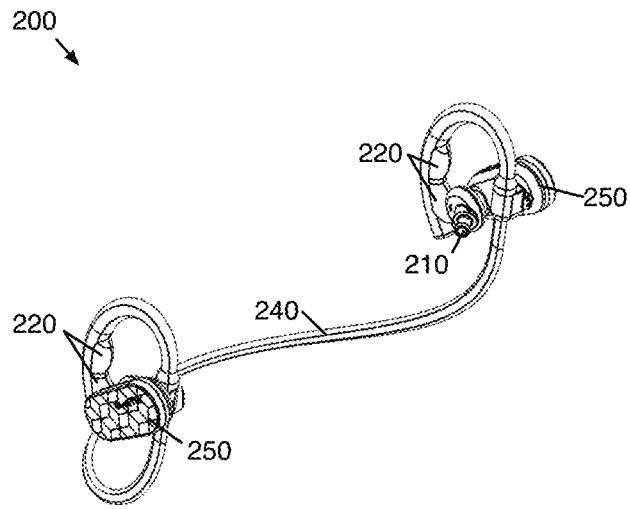
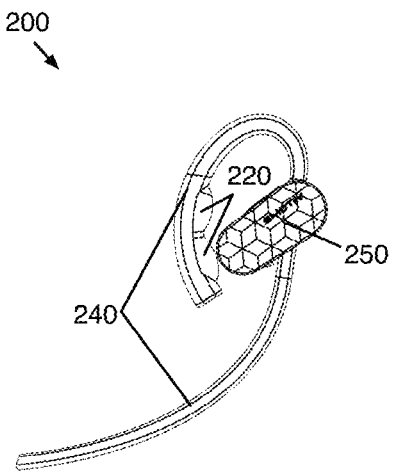
FIGURE 13A
FIGURE 13B
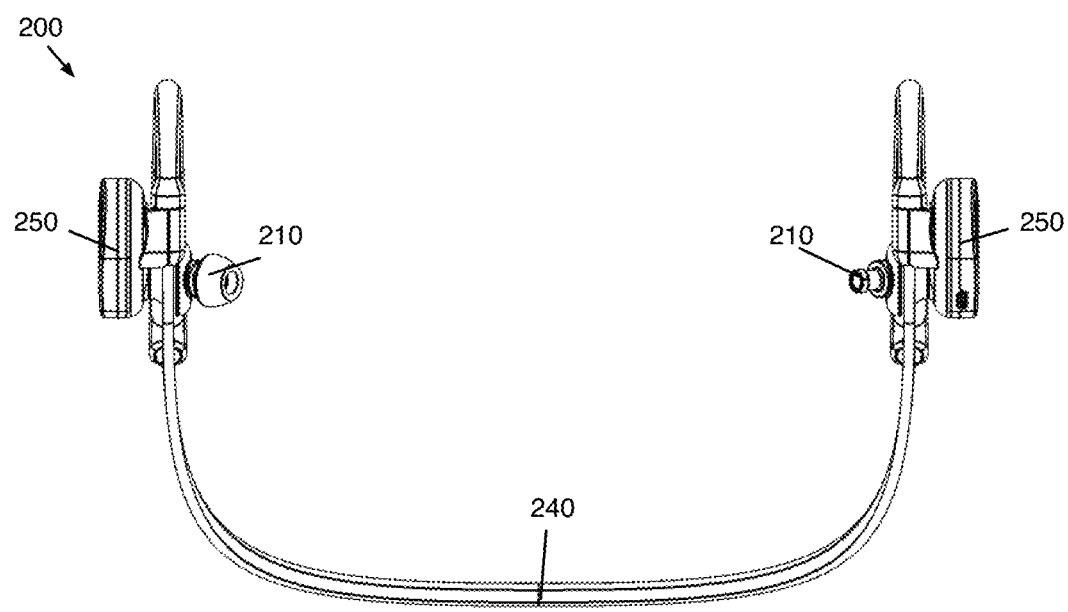
FIGURE 13C

METHOD AND SYSTEM FOR COLLECTING AND PROCESSING BIOELECTRICAL SIGNALS

CROSS-REFERENCE TO RELATED APPLICATIONS

This application is a continuation of U.S. application Ser. No. 16/390,881, filed 22 Apr. 2019, which is a continuation-in-part of U.S. application Ser. No. 15/209,582, filed 13 Jul. 2016, which claims the benefit of U.S. Provisional Application Ser. No. 62/201,256, filed 5 Aug. 2015, which are each incorporated in their entirety herein by this reference. This application claims the benefit of U.S. Provisional Application Ser. No. 62/660,853 filed 20 Apr. 2018, which is incorporated herein in its entirety by this reference.

TECHNICAL FIELD

This invention relates generally to the field of digital signal collection and processing, and more specifically to a new and useful method and system for collecting, processing, and analyzing bioelectrical signals.

BRIEF DESCRIPTION OF THE FIGURES

FIGS. 13A-13C depict perspective, side, and top views of a variation of an embodiment of the system.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
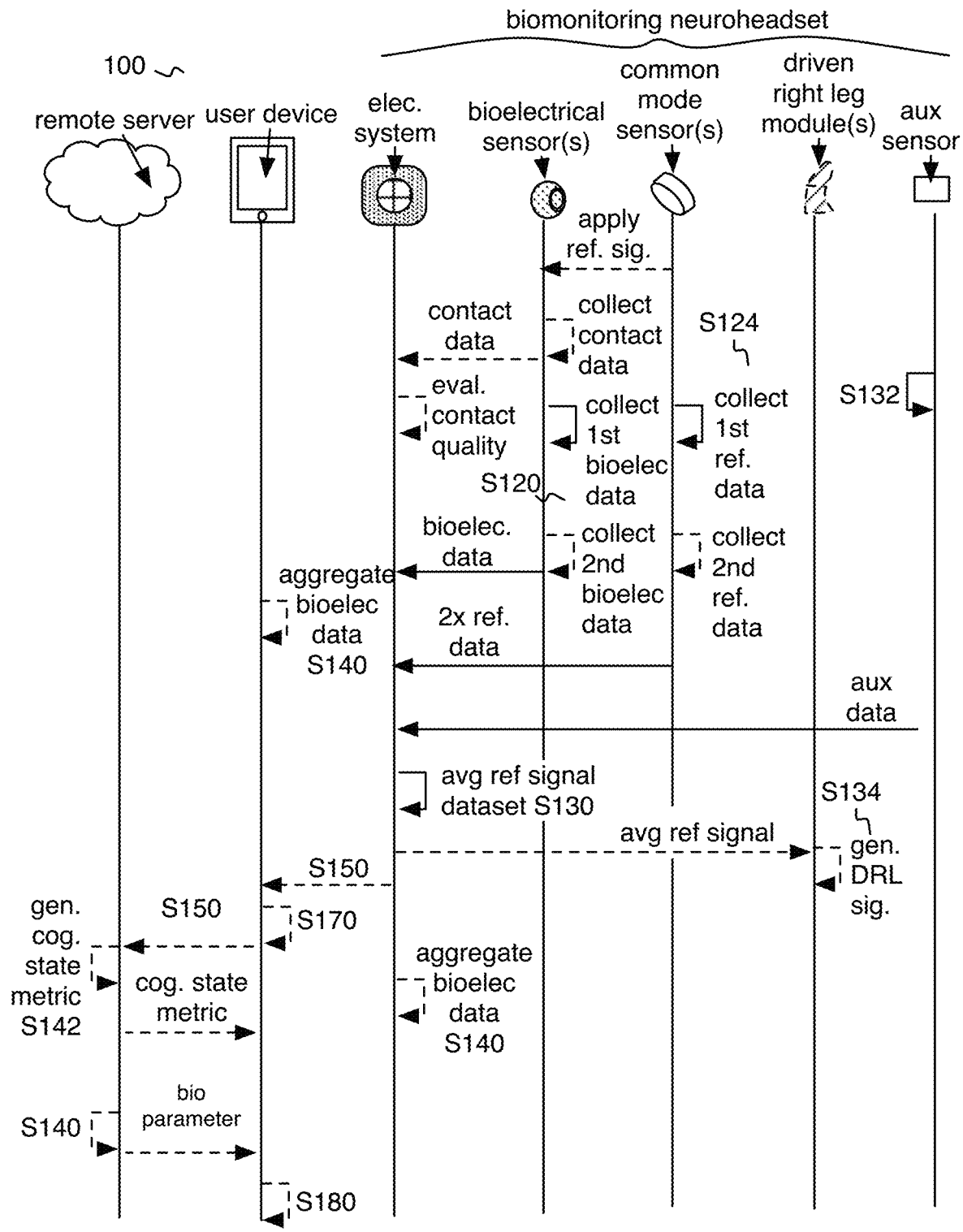
FIG. 1 depicts data flows of an embodiment of a method for detecting bioelectrical signals of a user.
Figure 2:
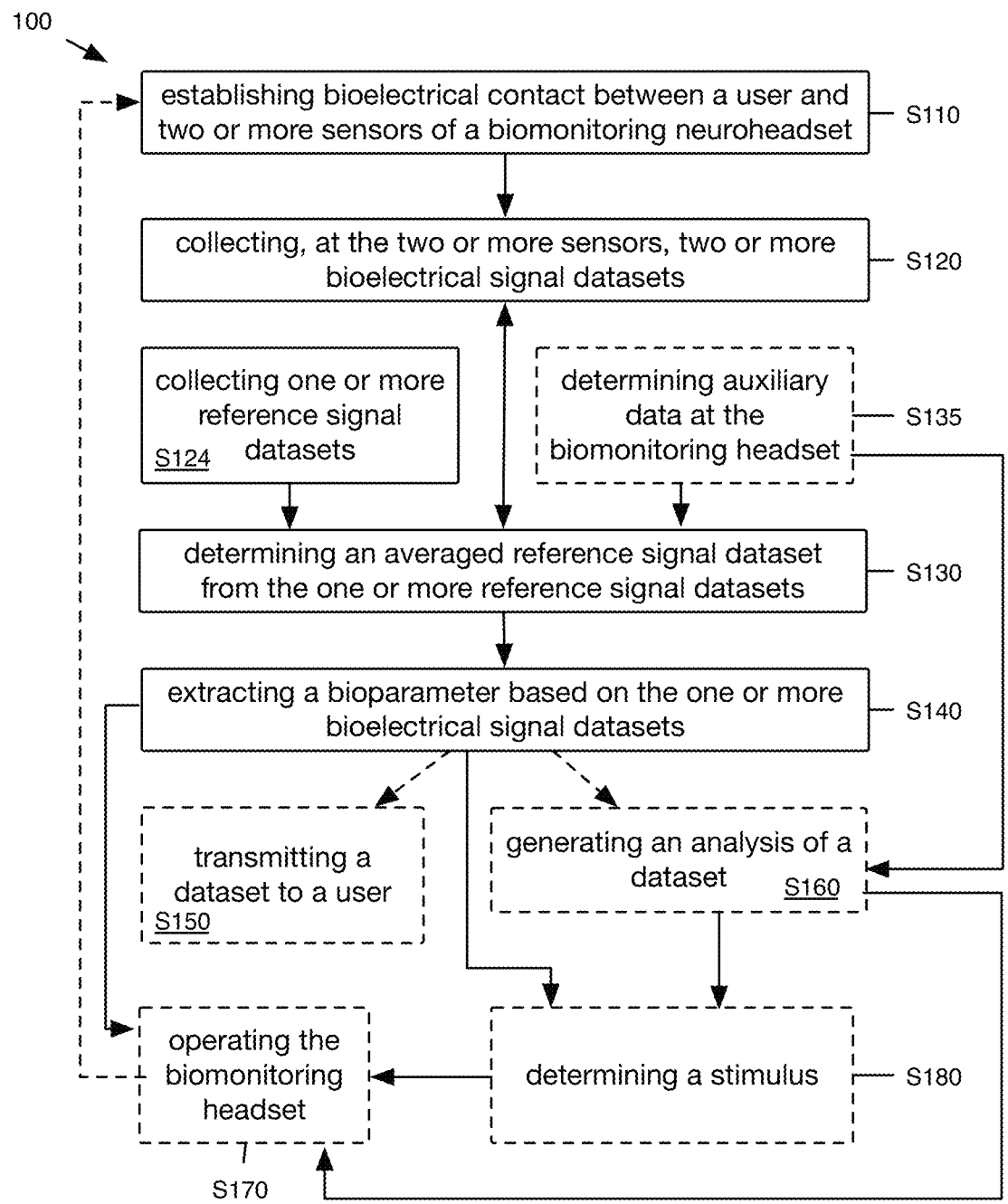
FIG. 2 depicts a flowchart of an embodiment of the method

As shown in FIGS. 1-2, an embodiment of a method 100 for detecting bioelectrical signals from a user, includes: establishing bioelectrical contact between a user and a sensor of a biomonitoring neuroheadset S110; sampling, at the sensor, a bioelectrical signal dataset S120; collecting one or more reference signal datasets S124; generating a reference signal dataset from the one or more reference signal datasets S130; and extracting a bioparameter from the bioelectrical dataset in combination with the reference signal dataset S140. In variants, S124 can include collecting two or more reference signal datasets, and S130 can include generating a combined reference signal dataset (e.g., averaged reference signal dataset) from two or more reference signal datasets, wherein the bioparameter can be extracted from the bioelectrical dataset in combination with the averaged reference signal dataset. The method 100 can additionally or alternatively include: determining auxiliary data at the biomonitoring headset S135; transmitting a dataset to a user and/or user device S150; generating an analysis of a dataset S160; operating a device (e.g., the biomonitoring headset, a third party device, etc.) S110; and, determining a stimulus S180. While variations of the method can be performed exclusively by a biomonitoring neuroheadset, other variations of the method can involve performance of portions of the method by any component of a system 200, including one or more of a remote server, a local processing system, a user device (e.g., a smartphone, a laptop, a tablet, a desktop, a smartwatch, etc.), a third party device, and/or any other suitable component.

In variations, the method 100 functions to collect, process, and analyze bioelectrical signals for monitoring psychological and/or physiological status of a user. The method 100 can additionally or alternatively function to leverage analyzed bioelectrical signals to specify control instructions for a user device (e.g., a smartphone, a biomonitoring neuroheadset, etc.), to generate (e.g., extract, create, process data into, etc.) bioparameters (e.g., a cognitive state metric describing emotional status, cardiovascular parameters, etc.) describing a user, and/or to provide stimulus (e.g., audio therapy) at an output 260 (e.g., speaker) of the biomonitoring neuroheadset. The method 100 is preferably performed with an embodiment, variation, or example of the system 200 (e.g., described in Section 4), but can alternatively be performed with any other suitable system and/or component.

As shown in FIGS. 13A-C, an embodiment of a system 200 for detecting bioelectrical signals from a user includes: two or more bioelectrical signal sensors 210 configured to collect bioelectrical signal data from the user; a noise reduction subsystem 220 including two or more reference sensors configured to collect reference signal data contemporaneously with the collection of bioelectrical signal data; an averaging module 230 coupled to the two or more reference sensors configured to generate an averaged reference signal (e.g., averaged reference signal data); a wearable support frame 240 worn at a head region of the user, the wearable support frame 240 supporting and physically connecting the two or more bioelectrical sensors 210 and the two or more reference sensors; and an electronics subsystem 250 including a processing module 252 configured to extract a bioparameter at least in part from processing the bioelectrical signal data with the averaged reference signal data, the electronics subsystem 250 electronically connected to the one or more bioelectrical signal sensors 210, the noise reduction subsystem 220, and the averaging module 230.

The system 200 functions to collect and process multiple types of data (e.g., electroencephalogram data, electrocardiogram data, audio/visual signal data, bioelectrical data, haptic feedback data, etc.) for monitoring psychological and/or physiological status of a user. The system 200 can additionally or alternatively function to ensure a high level of contact quality between sensors of the biomonitoring neuroheadset and the user, in order to accurately collect and analyze different types of data. The system 200 can perform any portions of the method 100 (e.g., described in Section 3), but the system 200 can additionally or alternatively perform any other suitable operations.

2. Benefits

In specific examples, the method 100 and/or system 200 can confer several benefits over conventional methodologies for collecting and processing bioelectrical signals (e.g., with auxiliary signals such as audio signals, multiple bioelectrical signal streams, etc.). Traditional approaches can face limitations from inability to contemporaneously measure multiple bioelectrical signals while preventing cross-talk and sufficiently eliminating associated noise. However, in specific examples, the method 100 and/or system 200 can perform one or more of the following:

First, the technology can leverage a biomonitoring neuroheadset for continuously monitoring bioelectrical signals of users for use in a plethora of time-dependent applications such as monitoring health status and neuromarketing. In an example of determining bioparameters, the technology can analyze electroencephalogram (EEG) signals and user input in order to determine both psychological status (e.g., generating a cognitive state metric corresponding to a user's emotional state at a given time period) and physiological status (e.g., determining cardiovascular bioparameters for a time period from EEG data collected proximal an ear region of the user). In an example of consumer research, neuromarketing, and/or neuromarketing or consumer insights, the technology can collect EEG signals and audio commentary from a user as the user is exposed to different types of media (e.g., advertisements, television, movies, video games, etc.) in order to determine how different aspects of media affect a user's emotional state.

Second, the technology can simultaneously collect both bioelectrical signals (e.g., EEG, electrocardiogram, electromyography, electrooculography, etc.) and auxiliary signals while preventing cross-talk and reducing noise associated with the signals in real-time. As such, the technology can generate combined bioelectrical signal and auxiliary signal processed datasets that are accurate and primed for subsequent transmission (e.g., to a user device, to a remote processing module, etc.) and analysis (e.g., for evaluating cognitive state).

Third, the technology can simultaneously collect bioelectrical signals from multiple body regions of the user and perform averaging and other processing operations on the simultaneously collected signals to improve system performance (e.g., reduce noise, reduce EEG event detection thresholds, etc.). As such, the technology can generate bioelectrical signal datasets (e.g., aggregated bioelectrical datasets) from one or more biosensors that are accurate and primed for subsequent transmission (e.g., to a user device, to a remote processing module, etc.) and analysis (e.g., for evaluating cognitive state). In one variation, the method generates a more accurate representation of the common mode noise and reduces the proximal signal component (e.g., typically present in measurements by reference sensors located proximal the biosensor or active electrode) by averaging the raw (bioelectrical) reference signals sampled at two or more physical locations on the user proximal (e.g., within several millimeters or centimeters of) the biosensor location(s). In a second variation, the method generates a more accurate representation of the common mode noise, even if the reference sensors (e.g., CMS electrodes, DRL electrodes) are arranged distal (e.g., separated by more than several millimeters or centimeters of) the biosensors. In an example, the use of multiple DRL locations distributes the feedback and also halves the contact impedance for the feedback system. The biosensors can include EEG sensors, active sensors, biopotential sensors, biosignal sensors, sensors that can sample any subset of the channels of a 10:20 EEG system, and/or any other suitable set of operational sensors. This can create a virtual resultant reference signal (e.g., referential montage) that is effectively mid-way between the two ear reference signals (e.g., in signal space). Furthermore, any independent EEG contribution from reference signals collected at each ear flap can be significantly reduced by the averaging process. Because the resultant reference signal averages out the proximal signal component present in the reference signals (e.g., minimizes the local effects of to-be-measured brain signals on a reference signal sampled near the biosensor), the resultant bioparameter values (e.g., EEG measurements), which are determined based on the potential difference between the bioelectrical signals (e.g., EEG signals) and the resultant reference signal, can have higher signal fidelity, while maintaining the common mode rejection.

In an example, the reference signal can be determined from the average value of signals (e.g., bioelectrical signals, biosignals) sampled from each of two ear locations (e.g., reference signals derived from the right and left ear flaps, wherein sensors are so located to collect bioelectrical signals) such that the reference signal contains averaged portions from both ear locations. The averaging process maintains those biosignal components common to both sensor locations (e.g., the "common mode signal" or background body potential), and the differential measurement of the biosignal at each ear canal location maintains a similar common mode rejection (e.g., substantially improving the common mode signal by removing or reducing non-common components, such as EEG and local muscle signals, which are present in a signal measured from a single location) as a reference sensor placed more closely to one or the other ear location. Simultaneously, the location-specific (e.g., EEG) signals from the two ear locations are measured relative to a reference level (e.g., the resultant reference signal), which contains a diminished contribution of the local signal (e.g., as opposed to the reference electrode proximal the respective ear location) due to the averaged referencing process. Measuring the location-specific signals relative to the resultant reference signal can result in improved signal fidelity versus a proximally-located reference sensor, which can cancel desired brain-derived signals due to the closely-collocated sensors.

Fourth, the technology can optionally include speakers (e.g., embedded in an ear bud with an EEG sensor), which can be used for emitting audio (e.g., audio therapies generated based on evaluated cognitive state of a user, music for recreational purposes, music for therapeutic purposes, etc.). A user's response (e.g., EEG signal response, audio signal response, evoked potential response etc.) to emitted audio samples can be continuously monitored using the biomonitoring neuroheadset providing the audio sample. In some examples, the user's cognitive state can be used as feedback to the audio source to adjust the emitted audio (e.g., change a song due to a user preference expressed in the cognitive state, such as a negative valence associated with the current song).

Fifth, as the technology can collect bioelectrical signals and audio signals contemporaneously in real-time, generated analyses (e.g., generated bioparameters, therapies, etc.) of collected data can be presented and/or promoted to a user in real-time (e.g., during the time period in which the data was collected). As such, the technology can provide real-time and/or retrospective (e.g., leveraging collected data stored at remote server) analyses. The technology can optionally collect contextual data and/or supplemental data (e.g., in addition to the EEG data), wherein the bioparameter can be determined from all or a subset of the aforementioned data (e.g., using sensor fusion, trained neural networks, etc.).

The technology can, however, provide any other suitable benefit(s) in the context of collecting bioelectrical signals and/or auxiliary signals for evaluating user status.

3. Method

As shown in FIGS. 1-2, an embodiment of a method 100 for detecting bioelectrical signals from a user can include: establishing bioelectrical contact between a user and a sensor of a biomonitoring neuroheadset S110; sampling, at the sensor, a bioelectrical signal dataset S120; collecting one or more reference signal datasets S124; generating an averaged reference signal dataset from the two or more reference signal datasets S130; and extracting a bioparameter from the bioelectrical dataset in combination with the averaged reference signal dataset S140.

In some variations, the method 100 can additionally or alternatively include: determining auxiliary data at the biomonitoring headset S135; transmitting a dataset to a user S150; generating an analysis of a dataset S160; operating a device (e.g., the biomonitoring headset, a third party device, etc.) S170; and, determining a stimulus S180.

In relation to the method 100, the two or more bioelectrical datasets are preferably combined with the averaged reference signal dataset in the analog domain, and the bioparameter is extracted from the combination (e.g., subsequent to amplification of the combination, differential amplification of the combination, amplification of the differential between the bioelectrical signal datasets and the averaged reference signal datasets, etc.) in the digital domain (e.g., via a digital computational process). In alternative variations, the two or more bioelectrical datasets are transformed into the digital domain prior to extraction of the bioparameter (e.g., in combination with the averaged reference signal dataset, which can be in the digital or analog domain). However, in additional or alternative variations, any suitable Block of the method 100 can be performed in the analog or digital domain, using any suitable components for signal processing in the analog or digital domains, respectively.

3.1 Establishing Bioelectrical Contact

As shown in FIG. 2, Block S110 recites: establishing bioelectrical contact between a user and two or more sensors of a biomonitoring neuroheadset, which functions to facilitate a bioelectrical interface between an individual and a biosignal detector. Establishing bioelectrical contact S110 is preferably between sensors of a biomonitoring neuroheadset and a human, but can additionally or alternatively be with a biomonitoring neuroheadset and any other suitable organism (e.g., a pet, an animal, etc.). One or more bioelectrical sensors of the biomonitoring neuroheadset preferably include one or more EEG sensors and one or more reference sensors (e.g., reference electrodes, common mode sense (CMS) biopotential electrodes, driven right leg (DRL) passive electrodes, etc.). Alternatively, the biomonitoring neuroheadset can omit specific reference sensors and self-reference the bioelectrical potential measurement (e.g., against an arbitrary reference value, a predetermined reference value, an electrical potential value detected at another EEG sensor, etc.) and/or otherwise suitably obtain a differential potential measurement. However, the biomonitoring neuroheadset can additionally or alternatively include any bioelectrical signal sensors configured to detect any one or more of: electrooculography (EOG) signals, electromyography (EMG) signals, electrocardiography (ECG) signals, galvanic skin response (GSR) signals, magnetoencephalogram (MEG) signals, and/or any other suitable signal.

Relating to Block S110, bioelectrical contact is preferably established through sensors arranged at a particular location or region of the user (e.g., head region, torso region, etc.). The sensors of the biomonitoring headset are preferably arranged at contralateral regions of a head region of the user in order to facilitate biosignal detection at opposing sides of the head region, but can be otherwise suitably arranged. For example, Block S110 can include establishing bioelectrical contact between a first subregion of an ear region of the user and an EEG sensor of a biomonitoring neuroheadset. In a specific example, the first subregion of the ear region (e.g., an ear region of a left ear) can include an ear canal (e.g., a left ear canal) of the user. Block S110 can also include establishing bioelectrical contact between a first contralateral subregion of a contralateral ear region (e.g., an ear region of a right ear) of the user and a second EEG sensor of the biomonitoring neuroheadset, where the first contralateral subregion can include a contralateral ear canal (e.g., a right ear canal) of the user.

In a first variation of Block S110 where the biomonitoring neuroheadset includes one or more common mode sensors, Block S110 can additionally or alternatively include establishing bioelectrical contact between a second subregion of the ear region of the user and a reference sensor (e.g., a common mode sensor) of a noise reduction subsystem of the biomonitoring neuroheadset S112. In a specific example of the variation, the second ear subregion is proximal the first subregion (e.g., within several millimeters, several centimeters, several inches, etc.), and the EEG sensor is proximal the reference sensor. In another specific example, the second ear subregion is distal the first subregion (e.g., several centimeters apart, several inches apart, etc.), and the EEG sensor is distal the reference sensor. In another specific example, Block S112 can include establishing bioelectrical contact between a second contralateral subregion of the contralateral ear region of the user and a second common mode sensor of a noise reduction subsystem of the biomonitoring neuroheadset. In this specific example, the second subregion can include an ear subregion proximal a mastoid process of a temporal bone of the user, and where the second contralateral subregion can include a contralateral ear subregion proximal a contralateral mastoid process of a contralateral temporal bone of the user. In this specific example, the first contralateral subregion is proximal the second contralateral subregion, and the second EEG sensor is proximal the second common mode sensor. In an illustrative example of the specific example, the system can include a left and right EEG sensor, and a right CMS sensor. In a second illustrative example, the illustrative example above can additionally include a second averaged CMS sensor.

In a second variation of Block S110 where the biomonitoring neuroheadset includes one or more driven right leg (DRL) sensors of a driven right leg module, Block S110 can include establishing bioelectrical contact between a third subregion of the ear region of the user and a DRL electrode of a DRL module of the noise reduction subsystem S114. The third subregion is preferably at an ear region (e.g., proximal a mastoid process of a temporal bone of the user), but can alternatively be at any suitable anatomical position of the user. This variation can be used in combination with, or independently from, the second variation.

In one example, the biomonitoring neuroheadset includes two or more DRL electrodes arranged in two locations on the user (e.g., a third and fourth ear subregion), in addition to two or more CMS sensors arranged on the user. In a specific example, the headset includes at least a first and second DRL electrode arranged proximal (e.g., within several millimeters, centimeters, etc.) another reference sensor, such as a CMS sensor (e.g., wherein the first and second DRL electrodes are arranged proximal a first and second reference sensor, respectively, but can alternatively be arranged proximal the same reference sensor). In this specific example, the reference sensors (that the DRL electrodes are arranged proximal to) are preferably the reference sensors outputting the reference signals that are subsequently averaged, but can alternatively be other reference signals. This can function to generate a virtual reference similar to a linked-ear reference, which can cancel true common mode signals and/or resolve imbalanced compensation problems resulting from collocated DRL and CMS electrodes. This can also provide some redundancy in the feedback path, which can improve the chance that at least one DRL electrode will be in good contact with the user.

In variations of Block S110, establishing bioelectrical contact can include any elements analogous to those disclosed in U.S. patent application Ser. No. 13/903,861 filed 28 May 2013, U.S. patent application Ser. No. 14/447,326 filed 30 Jul. 2014, and U.S. patent application Ser. No. 15/058,622 filed 2 Mar. 2016, which are hereby incorporated in their entirety by this reference. However, establishing bioelectrical contact between body regions of a user and different types of sensors can be performed in any suitable manner.

3.2 Collecting a Bioelectrical Signal Dataset

As shown in FIG. 2, Block S120 recites: collecting, at the one or more sensors, one or more bioelectrical signal datasets, which functions to collect data indicative of a psychological and/or physiological state of a user. The collected dataset(s) preferably include bioelectrical signal data collected at one or more sensors in bioelectrical contact with the user as described in relation to Block S110. For example, Block S120 can include collecting one or more EEG, EOG, EMG, ECG, GSR, and/or MEG signal datasets at corresponding bioelectrical sensors. Additionally or alternatively, any suitable dataset (e.g., supplemental data, etc.) can be collected at a user device. Further, any number, size and/or sizes of datasets can be collected.

In relation to Block S120, collecting one or more bioelectrical signal datasets is preferably characterized by collection instructions given by a processing module (e.g., a control printed circuit board) of an electronics subsystem of the biomonitoring neuroheadset. Additionally or alternatively, Block S120 can include collecting one or more bioelectrical signal datasets according to predetermined (e.g., by a manufacturer, by a user, by a care provider, etc.) and/or automatically determined (e.g., based on a computational model, thresholds, etc.) collection instructions and/or parameters. However, collecting one or more bioelectrical signal datasets can be characterized by any suitable criteria.

With respect to temporal aspects relating to Block S120, collecting one or more bioelectrical signal datasets can be performed during, associated with, and/or correspond to any suitable temporal indicator (e.g., time point, time window, time period, duration, etc.). Time periods can be of any suitable length (e.g., on the order of seconds, minutes, hours, days, etc.). In variations, Block S120 can be performed in response to (e.g., instantaneously, substantially instantaneously, etc.) events such as an audible signal (e.g., a detected audio signal, provided audio content, etc.), a visual signal (e.g., a detected visual signal, displayed visual content such as an image, etc.), and any other suitable event. In a specific example, Block S120 can include collecting, at an EEG sensor, an EEG signal dataset from the user during a first time period. Additionally or alternatively, collecting one or more bioelectrical signal datasets S120 can be performed during time periods in which the user is performing a specific activity. Specific activities can include any combination of: engaging in content (e.g., digital content, television, music, film, video games, etc.), interacting with other individuals (e.g., during conversation, at a social activity, at a workplace activity), daily activities (e.g., at home, at work, during sleep, during meals, etc.), and/or any other suitable activity. However, collecting one or more bioelectrical signal datasets can be performed at any suitable time as the user performs any suitable action.

In relation to temporal aspects of Block S120 and other portions of the method 100, time points (e.g., time stamps, temporal markers indicative of regions of the bioelectrical signal datasets, etc.) can include: a start or stop time of a piece of media content (e.g., a video observed by the user), detection of the user making a gesture, and other periods of time of low specificity. Additionally or alternatively, time points can be of high specificity (e.g., indicative of the exact moment of onset of a visual, audible, or other stimulus). High specificity time points can be utilized to detect responses in the bioelectrical signals (e.g., spontaneous involuntary brain responses, evoked potentials, etc.). Such responses can be extracted in the course of a single trial (e.g., single bioelectrical signal collection), repeated trials (e.g., repeated application of identical stimuli and subsequent signal averaging to improve signal-to-noise ratio of the evoked potential response above background bioelectrical signals), or otherwise suitably extracted. In cases wherein repeated trials are utilized, high specificity time localization of response to stimuli can be used to determine and/or label bioelectrical signal portions corresponding to the stimulus response (e.g., label time locked stimuli corresponding to one sample period, such as 3 milliseconds for a 256 Hz sampling rate, etc.).

Regarding Block S120, additionally or alternatively, collecting one or more bioelectrical signal datasets can include any elements disclosed in U.S. patent application Ser. No. 13/903,861 filed 28 May 2013, U.S. patent application Ser. No. 14/447,326 filed 30 Jul. 2014, and U.S. patent application Ser. No. 15/058,622 filed 2 Mar. 2016, which are hereby incorporated in their entirety by this reference. However, Block S120 can be performed in any suitable manner.

Regarding Block S120, the collected bioelectrical signal datasets are preferably differential measurements referenced to a reference value, but can alternatively be the signal (e.g., voltage) sampled at a biosensor (e.g., bioelectrical sensor) or be any other suitable set of signals. The reference value is preferably determined by collecting one or more reference signal datasets at one or more reference sensors, as described further below.

3.3 Collecting a Reference Signal Dataset

As shown in FIGS. 1-2, Block S124 recites: collecting one or more reference signal datasets, which functions to collect reference signal data against which to reference the bioelectrical signal datasets collected in Block S120 (e.g. in a differential potential measurement, individually referencing, referencing after averaging the reference signal datasets as in Block S130, etc.). Collecting one or more reference signal datasets is preferably performed with one or more reference electrodes (e.g., arranged proximal the sensor, the biosensor electrode, the active electrode, EEG electrode, etc.), common mode sensors, and/or one or more DRL electrodes or modules. In a specific example, Block S124 can include collecting, at a common mode sensor, a common mode signal dataset, where the common mode signal dataset can enable detection and removal of common-mode components of noise to facilitate downstream signal processing. Additionally or alternatively, one more collected reference signal datasets can include any suitable amount, type and/or combination of reference signals for reducing noise associated with any suitable dataset related to the method 100.

With respect to temporal aspects relating to Block S124, collecting one or more reference signal datasets is preferably performed in parallel, simultaneously, and/or contemporaneously with collecting one or more bioelectrical signal datasets as in Block S120. As such, Block S124 is preferably performed during the same temporal indicator (e.g., during the same time period) at which Block S120 is performed. In a specific example, Block S124 can include collecting, at a common mode sensor, a common mode signal dataset contemporaneously with collecting an EEG signal dataset during a time period. In a second specific example, Block S124 can include sampling (and/or collecting), a first and second reference signal dataset with a first and second reference sensor, respectively, during the same time period as EEG signal dataset sampling (and/or collecting) with the sensor (e.g., EEG sensor). In this specific example, at least one of the first and second reference sensors is collocated (e.g., within a predetermined distance) with the sensor (e.g., EEG sensor). Additionally or alternatively, reference signal datasets can be collected concurrently, contemporaneously, in serial, before, after, and/or with any other suitable relationship to other portions of the method 100. The reference sensors are preferably common mode sensors (e.g., CMS biopotential electrodes), but can alternatively be ground sensors (ground electrodes) or be any suitable sensor (e.g., any subset of the channels of a 10:20 EEG system).

In a variation of Block S124, collecting reference signal datasets can include collecting a plurality of reference signal datasets at a set of reference sensors of the biomonitoring neuroheadset. For example, the biomonitoring neuroheadset can include a set of two reference sensors (e.g., a first reference sensor or electrode proximal a left ear region, and a second reference sensor or electrode proximal a right ear region). In this example, Block S124 can include collecting a first reference signal dataset at the first reference sensor, and collecting a second reference signal dataset at the second reference sensor. The first and second reference signal datasets can be common mode signal datasets, or be other reference signal datasets. The first and second reference sensors can be common mode sensors, or be other reference sensors. In another example, the biomonitoring neuroheadset can additionally or alternatively include a DRL module including a set of DRL electrodes (e.g., a first DRL electrode proximal a first common mode sensor and a left ear region, and a second DRL electrode proximal a second common mode sensor and a right ear region). In examples with a plurality of reference sensors, reference signal datasets can be collected with the plurality of reference sensors contemporaneously, simultaneously, serially, and/or with any suitable temporal relationship.

In a second variation, S124 can include collecting the reference signal datasets from a single reference sensor. In this variation, the system (e.g., biomonitoring headset) can include a single reference sensor, or include multiple reference sensors. When the system includes a single reference sensor, the reference sensor can be located proximal one or more of the biosensors (active sensors) (e.g., the reference sensor can be located on the ear flap adjacent to the canal sensor), or be located distal all of the active sensors. When the single reference sensor is arranged proximal a biosensor (active sensor), the proximal bioelectrode sensor may measure an attenuated signal (e.g., both the reference sensor and the ear canal can share brain signals as well as body potential to a significant extent), while a distal bioelectrode sensor may measure an amplified (or more accurate) signal. In this embodiment, the method can selectively use: only the distal biosensor's measurement (e.g., optionally including an independent floating measurement circuit for each distal biosensor), only the proximal biosensor's measurement, determine the bioparameter from a weighted calculation of the proximal and distal bioelectrode sensors' measurements, determine an average of the reference signals and comparing each biosensor's measurement against the average, or otherwise use the bioelectrode sensors' measurements.

Block S124 can additionally or alternatively include any elements disclosed in U.S. patent application Ser. No. 14/447,326 filed 30 Jul. 2014, which is hereby incorporated in its entirety by this reference. However, Block S124 can be performed in any suitable manner.

3.4 Generating a Reference Signal Dataset

As shown in FIG. 2, Block S130 includes: generating a reference signal dataset from the one or more reference signal datasets (e.g., collected in Block S120, Block S124, etc.). The reference signal dataset is preferably a combined reference signal dataset (e.g., an averaged reference signal dataset), wherein the reference signals from multiple reference sensors and/or a time series of reference signals from individual reference sensor(s) are combined into the combined reference signal dataset, but can additionally or alternatively include an individual reference signal dataset (e.g., including a single reference signal value for a single timepoint; a reference signal for a single reference sensor; etc.). Block S130 functions to generate a reference potential (e.g., common mode potential) for bioelectrical potential measurements (e.g., EEG measurements, ECG measurements, bioelectrical signal datasets, etc.). Block S130 can also function to produce a reference signal that averages reference potential characteristics from multiple body locations. Block S130 is preferably performed by an averaging circuit as described below in Section 4, but can additionally or alternatively be otherwise suitably performed by any suitable component or process (e.g., in the digital domain).

In variants, S230 generates a more accurate common mode body potential signal, such as by combining the reference signals measured from different parts of the user (e.g., from different sides of the user). For example, the left and right reference signals can be averaged, such that the left and right EEG components in the averaged signal can be significantly reduced by this process, while the true common components that appear in both sides are retained. The reference signals (e.g., a reference signal dataset) are preferably combined over time (e.g., reference signals from a time series are combined), but can additionally or alternatively be combined for a single time point (e.g., sampling timepoint or sampling duration). The reference signals are preferably sampled by a plurality of reference sensors, but can additionally or alternatively be sampled by a single reference sensor. The reference signals can be combined by averaging (e.g., unweighted average, weighted average, etc.), or otherwise combined. The reference signals can be instantaneously combined (e.g., simultaneously averaged) in real- or near-real time (e.g., during system operation), but can additionally or alternatively be averaged asynchronously (e.g., wherein the channel signals can be referenced against historical signals or a lagging average). In a specific example, the reference signals can be combined in real time, such that the EEG signals measured at each time instant can be the difference between the measured EEG channel potential) at said time instant) and the averaged reference potential at said time instant. However, the reference signal dataset can be otherwise determined.

In variations of Block S130, a plurality of reference signal datasets collected by a set of reference signal sensors can be used in producing an averaged reference signal dataset. Block S132 can include processing a plurality of reference signal datasets into a single combined reference signal dataset. Block 132 (and/or Block 130) is preferably performed in real- or near-real time (e.g., as the reference signal datasets are being sampled or collected S124), but can alternatively be performed asynchronously with Block S124 (e.g., after S124, after a sampling session, etc.), or at any suitable time.

The reference signals that are combined into a single value within the combined reference signal dataset are preferably concurrently sampled (e.g., share a common or the same timestamp) by different reference sensors (and/or be reference signals from different reference channels), but can alternatively be signals sampled by the same reference sensor (e.g., signals from the same reference channel) sampled across a time period, or be any other suitable set of reference signals.

Processing operations preferably include averaging operations (e.g., averaging values from multiple reference signal datasets collected during a same time period. calculating the combined reference signal values using a weighted equation, etc.), but can include any of the processing operations described with respect to Block S130, and/or any other suitable processing operation. The weights in the weighted equation can be determined through calibration, predetermined, determined based on reference sensor proximity to the bioelectrical sensor, sensor parameters (e.g., age, wear), or otherwise determined.

In a first example, generating a combined (e.g., averaged) reference signal dataset includes performing an averaging operation with a first reference signal dataset (e.g., collected at a left ear region of the user during a time period with a left reference sensor) and a second reference signal dataset (e.g., collected at a right ear region of the user during the time period with a right reference sensor), and where producing a common noise-reduced EEG dataset comprises producing the common noise-reduced EEG dataset based on the combined common mode signal dataset. The first and second reference signal datasets are preferably common mode signals, wherein the first and second reference sensors are preferably common mode sense electrodes; however, the first and second reference signal datasets can be any suitable dataset, and the first and second reference sensors can be any suitable reference sensor. This is preferably performed in the analog domain, but can additionally or alternatively be performed in the digital domain (e.g., in post processing).

However, utilizing a set of reference signal datasets collected by a set of reference signal sensors can be performed in any suitable manner for generating a noise-reduced bioelectrical signal dataset.

Block S130 can include Block S134, which includes: generating a driven right leg signal. Block S134 functions to reduce common mode interference (e.g., from electromagnetic interference) in generating a common mode noise-reduced dataset for downstream analysis. Generating a driven right leg signal preferably includes actively canceling common mode interference with a driven right leg module of a noise reduction subsystem of the biomonitoring neuroheadset. The driven right leg module is preferably characterized by a feedback reference location at a third subregion of the ear region (e.g., where a bioelectrical signal sensor is positioned proximal a first subregion, and where a reference signal sensor is positioned proximal a second subregion), where producing the noise-reduced bioelectrical signal dataset includes producing the noise-reduced bioelectrical signal dataset from the driven right leg signal. The third subregion is preferably at an ear region of the user, but can alternatively be at any suitable anatomical position of the user. In a specific example, the third subregion includes the mastoid process of the temporal bone corresponding to the ear region, but can include any other suitable region of the ear. Additionally or alternatively, a driven right leg module can reduce common mode noise in any suitable manner.

In relation to temporal aspects of Block S134, generating a driven right leg signal is preferably performed contemporaneously with collecting a common mode signal dataset (e.g., as in Block S124), such that common mode interference can be canceled by the driven right leg module during the time period in which the bioelectrical signal dataset and corresponding mode signal dataset are collected. However, generating a driven right leg signal can be performed at any suitable time and/or with any suitable temporal resolution; in particular, temporal aspects of Block S134 can be performed in an analogous manner to bioelectrical signal collection (e.g., in accordance with one or more variations of Block S120 as described above).

In relation to Block S134, the generated driven right leg (DRL) signal preferably produces a fast antiphase compensation signal, which can function to cancel fast and slow oscillations and drift in the body potential. For example, the body potential can oscillate at 50 Hz or 60 Hz due to electromagnetic pick-up from electrical mains (e.g., power-line noise), and the amplitude of this oscillation may be several volts. In this example and related examples, the signal generated by a DRL circuit (e.g., the DRL signal) imposes an exact copy of the body potential variation onto the DRL electrode (e.g., a reference sensor), preferably causing the electronic detection circuit (e.g., that generates the bioelectrical signal dataset) to follow the body oscillations (e.g., as a moving reference value). In this example and related examples, the reference input voltage (e.g., reference signal data) for each EEG sensor can be derived from the mid-rail voltage of the sensor, which has the body potential variation imposed on it by operation of the DRL circuit, and the common mode signal can thereby be removed from the difference measurement (e.g., the bioelectrical measurement) and variations due to brain or muscle activity adjacent to the sensor are passed into the detection circuit for further analysis (e.g., in other Blocks of the method). Additionally or alternatively, the DRL signal can function to drive a reference level (e.g., a reference for a differential bioelectrical signal measurement) to follow the background body potential (e.g., to cancel common mode noise). The DRL signal can also encode a measurable perturbation, which can be detected in each bioelectrical signal dataset, wherein the amplitude of the detected perturbation can be proportional to the series conductance of the CMS chain and the sensor (e.g., the amplitude can vary on a sensor by sensor basis in inverse proportion to the impedance of the electrical contact). In variants, the real-time impedance measurement can be used to provide feedback information to the user, enabling the user to optimize the positioning and contact quality of individual biopotential electrodes (e.g., based on an impedance measurement-user feedback loop), so as to: improve the quality of the biopotential signals measured, and to reduce noise which may be induced by poor contact quality (e.g., characterized by a higher than usual contact impedance). The real time impedance measurement can be measured and used as described in U.S. application Ser. No. 16/227,004 filed 20 Dec. 2018 each of which is incorporated herein in its entirety by this reference, and/or be otherwise measured and used. However, generating and using a DRL signal can be otherwise suitably performed.

In a variation of Block S134, generating one or more driven right leg signals can be performed by one or more driven right leg modules including a plurality of feedback reference locations. Feedback reference locations beyond the first are preferably redundant, such that sufficient contact between the driven right leg module and the user is only required for a single feedback reference location in order to facilitate common mode interference reduction. Additionally or alternatively, driven right leg module functionality can be allocated across feedback reference locations, such that additional noise reduction can be conferred through sufficient contact between a user and multiple feedback reference locations. In a specific example, the driven right leg module can be characterized by a first feedback reference location at a third subregion of an ear region (e.g., where a first bioelectrical signal sensor is positioned at a first subregion, and a first common mode sensor is positioned at a second subregion), by a second feedback reference location at a third contralateral subregion (e.g., where a second bioelectrical signal sensor is positioned at a first contralateral subregion, and a second common mode sensor is positioned at a second contralateral subregion) of the contralateral ear region, where the third contralateral subregion is proximal the first and the second contralateral subregions of the contralateral ear region, and where generating the driven right leg signal is in response to adequate contact between the user and the driven right leg module at least at one of the first feedback reference location and the second feedback reference location. However, this variation of Block S134 can be performed in any suitable manner.

Additionally or alternatively, Block S130 and Block S134 can include any elements described in U.S. patent application Ser. No. 14/447,326 filed 30 Jul. 2014, which is herein incorporated in its entirety by this reference. However, Block S134 can be performed in any suitable manner. Block S134 is preferably performed by a driven right leg module, as described in Section 4 below, but can additionally or alternatively be performed using any suitable system and/or components.

3.5 Determining a Bioparameter

As shown in FIGS. 1-2, Block S140 recites: determining a bioparameter. Block S140 functions to analyze bioelectrical signals in determining a parameter describing physiological and/or psychological status of a user. Types of bioparameters can include any one or more of: cognitive state metrics (e.g., attention, cognitive load, stress, fatigue, valence, arousal, engagement, preferences, intentions, etc.), psychological traits or conditions (e.g., impulsivity, resilience, focus, anxiety, depression, chronic stress, etc.), mental state, cardiovascular parameters, diagnostic analyses (e.g., identification of symptoms correlated with a diagnosis, etc.), treatment response parameters (e.g., response to medication, response to therapy, etc.), communication disorders (e.g., expressive language disorder, language impairment, autism spectrum disorder, etc.), and/or any other suitable bioparameter descriptive of a physiological and/or psychological status of a user.

In variations, Block S140 can include: generating an aggregated bioelectrical signal dataset based on a combination of two or more bioelectrical signal datasets (e.g., collected in Block S120), and determining the bioparameter based on the aggregated bioelectrical signal dataset. However, determining the bioparameter can additionally or alternatively include determining the bioparameter based on one or more of the two or more bioelectrical signal datasets in isolation (e.g., non-aggregated).

In relation to Block S140, determining a bioparameter is preferably based on, determined by, and/or derived from the bioelectrical signal dataset (e.g., based on averaged and/or noise-reduced bioelectrical signals collected by multiple sensors of a biomonitoring neuroheadset). For example, determining a bioparameter can include extracting signal features and/or patterns from a noise-reduced bioelectrical signal dataset(s); extracting bioelectrical features (e.g., EEG-related features) from bioelectrical signals (e.g., EEG signals) associated with the noise-reduced bioelectrical signal dataset(s); and processing the bioelectrical features with a bioparameter model to determine one or more bioparameters for the user; or otherwise determining a bioparameter. The noise-reduced bioelectrical signal dataset can be: a common noise-reduced EEG dataset (e.g., a left dataset, a right dataset, a composite dataset generated from the left and right datasets, etc.), the raw bioelectrical signal dataset collected in S120, or be any other suitable bioelectrical dataset.

Additionally or alternatively, data associated with any suitable dataset can be used in generating a bioparameter. In variations, determining one or more bioparameters can include generating and/or implementing one or more bioparameter models. Generating a bioparameter model can include processing any one or a combination of probabilities properties, heuristic properties, deterministic properties, rule-based properties, and/or any other suitable feature algorithmically to determine bioparameters of a user. In a specific example, Block S140 can include training a machine learning bioparameter model based on audio features, bioelectrical signal features (e.g., EEG, heart rate, and heart rate variability), kinematic features (e.g., motion sensor outputs indicative of head gestures, balance, gait, steps, activities, 3D movement, etc.), and corresponding bioparameter labels; predicting a bioparameter for a user from using the trained machine learning bioparameter model with user audio feature inputs and user bioelectrical signal feature inputs. Audio features can include features from output audio (e.g., user-initiated sounds, such as speech, singing, tones, clicks, responses, instructions, verbal commands, etc.; music; etc.), input audio (e.g., stimuli, such as incoming sounds, tones, music, others' speech, etc.), or from any suitable audio source. Additionally or alternatively, machine learning approaches can include any suitable machine learning approach. However, determining a bioparameter can be performed with any suitable approach.

Regarding Block S140, determining a bioparameter is preferably performed by a remote server, but portions of Block S140 can additionally or alternatively be performed by a biomonitoring neuroheadset (e.g., onboard the neuroheadset), another user device (e.g., a user smartphone, a user computer, etc.), and/or any other suitable component. Determining a bioparameter S140 is preferably performed after generating a noise-reduced bioelectrical signal dataset, but can alternatively or additionally be performed at any suitable time. For example, Block S140 can be performed in response to receiving, at a remote server, data associated with the noise-reduced bioelectrical signal dataset. Additionally or alternatively, determining a bioparameter can be performed before generating a noise-reduced bioelectrical signal dataset, or at any suitable time. Bioparameters of different types can be generated contemporaneously, in parallel, in serial, and/or with any suitable time relationship. For example, the method 100 can include generating a cognitive state metric and a cardiovascular parameter for a user contemporaneously during a time period. However, portions of Block S140 can be performed by an suitable component at any suitable time.

In specific examples, Block S140 can additionally or alternatively include testing for perceptual and/or cognitive function. Examples of psychological and/or physiological functions that can be tested can include one or more of: deafness, low level brain function, mental disorders, sensory disorders, and/or any other suitable perceptual and/or cognitive function. Testing for perceptual and/or cognitive function can include providing a stimulus, such as: emitting an audio sample (e.g., as in variations of Block S180) with one or more speakers of the biomonitoring neuroheadset; collecting bioelectrical signal data (e.g., with an EEG sensor) contemporaneously with emitting the audio sample; and generating a perceptual and/or cognitive function parameter describing the functionality of a psychological and/or physiological aspect of the user. Testing for perceptual and/or cognitive function can additionally or alternatively include providing various other stimuli, including tactile stimuli, visual stimuli, and any other suitable sensory stimuli, and collecting bioelectrical signal data and/or auxiliary data (e.g., reaction or response features, such as intensity, reaction time, response time, etc.) in conjunction with providing the stimulus and/or stimuli to thereby generate a perceptual and/or cognitive function parameter in any other suitable manner. Perceptual and/or cognitive function parameters can be generated based on multiple EEG datasets (e.g., where the data is averaged over the repeated acquisitions) collected contemporaneously with emission of a set of audio samples (e.g., a set of different audio samples, a set of the same audio sample repeated multiple times, etc.), but can additionally or alternatively be generated based on, determined by, and/or derived from any suitable data (e.g., supplemental sensor data, etc.). However, testing for perceptual and/or cognitive function can be performed in any suitable manner.

In a variation of Block S140, determining one or more bioparameters can additionally or alternatively include determining one or more cognitive state metrics S142. A cognitive state metric preferably indicates a cognitive state of a user. Cognitive state can include one more of: mood, emotional state, psychological health, focus level, thought processes, language abilities, memories, reasoning abilities, and/or any suitable cognitive state. Determining a cognitive state is preferably based on, determined by, and/or derived from audio data and bioelectrical data associated with at least one of: raw datasets (e.g., collected bioelectrical signal datasets as in Block S120, reference signal datasets as in Block S124), processed datasets (e.g., noise-reduced bioelectrical signal datasets, aggregated bioelectrical datasets, driven right leg signals, etc.), cardiovascular parameter data (e.g., heart rate and/or heart rate variability), user kinetic behavior data (e.g., indicative of user motion, gait, balance, gestures, etc.), and/or any other suitable data. In a specific example, Block S142 can include receiving, at a remote server, an EEG dataset (e.g., common-noise reduced EEG dataset) and cardiovascular parameter data; and generating a cognitive state metric based on the EEG dataset and the cardiovascular parameter, wherein the cognitive state metric indicates a cognitive state of the user during a time period (e.g., a time period in which the raw EEG dataset and cardiovascular parameter were collected). Additionally or alternatively, determining a cognitive state metric can include any elements described in U.S. application Ser. No. 13/903,832, filed 28 May 2013, and U.S. application Ser. No. 15/058,622 filed 2 Mar. 2016, each of which are herein incorporated in their entirety by this reference. However, determining a cognitive state metric can be performed in any suitable manner.

Figure 16:
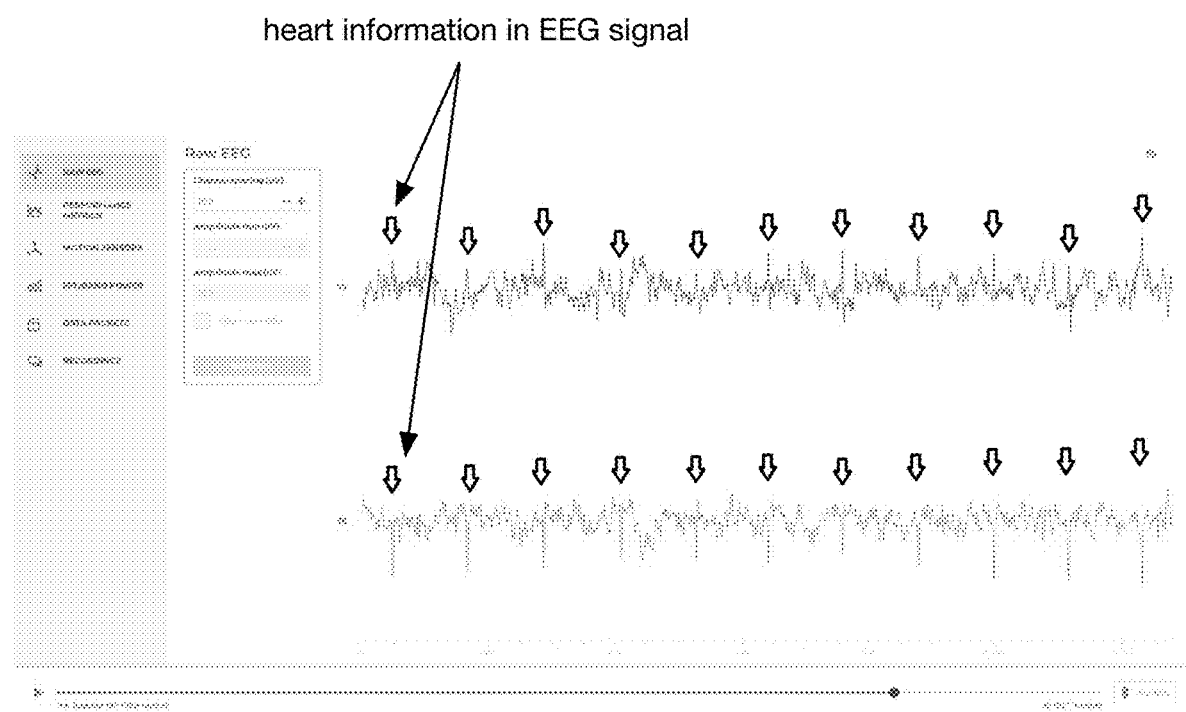
FIG. 16 is a specific example of extracting heart features from an EEG signal.

In another variation of Block S140, determining one or more bioparameters can additionally or alternatively include determining one or more cardiovascular parameters. Cardiovascular parameters can include one or more of: heart rate, heart rate variability, blood pressure, blood pressure variability, blood flow, heartbeat signatures, measures of blood vessel stiffness, measures indicative of atherosclerosis or other cardiovascular disease, other measures of cardiovascular risk, and/or any other suitable cardiovascular parameter. A specific example is shown in FIG. 16 (e.g., showing extracting heart features, such as ECG artifacts, from the EEG signal). Determining one or more cardiovascular parameters is preferably based on, determined by, and/or derived from bioelectrical signal features associated with a bioelectrical signal dataset (e.g., collected as in Block S120, a noise-reduced signal dataset (e.g., generated as in Block S144), bioelectrical signal portions of a combined noise and bioelectrical signal processed dataset (e.g., generated as in Block S130), and/or any suitable datasets including bioelectrical signal features. Additionally or alternatively, determining one or more cardiovascular parameters can be based on audio signal features (e.g., breathing patterns) extracted from datasets associated with any suitable dataset. However, any suitable cardiovascular parameters can be generated from any suitable data.

In variations, determining one or more cardiovascular parameters is preferably based on detecting a slow oscillation in collected EEG signals, the slow oscillation arising from blood flow in sync with a pulse of a user. Collected EEG signals (e.g., noise-reduced EEG signals of a combined audio and EEG processed dataset) also preferably include PQRST complex sequences (e.g., analogous to PQRST spike sequences observed in ECG signals). In a specific example, Block S164 can include identifying a blood flow time-varying oscillation in noise-reduced values of a noise-reduced EEG dataset (e.g., a common noise-reduced EEG dataset); and estimating at least one of a heart rate and a heart rate variability based on the blood flow time-varying oscillation in noise-reduced values, where the at least one of the heart rate and the heart rate variability corresponds to a time period (e.g., a time period in which the raw EEG dataset was collected). In this specific example, identifying the blood flow time-varying oscillation in noise-reduced values can include identifying a set of QRS complex sequences in the noise-reduced values of the noise-reduced EEG dataset, and where estimating the at least one of the heart rate and the heart rate variability is based on the set of QRS complex sequences. In another specific example, Block S164 can include searching (e.g., pattern matching) for specific characteristics in the time-varying oscillation (e.g., overlaid on the background EEG signal), which can include patterns such as a PQRS complex, a slow reproducible oscillation in background voltage in the range 0.75-3 Hz, and any other suitable pattern that can be associated with cardiovascular parameters (e.g., heart beat, pulse, etc.) However, determining one or more cardiovascular parameters can be performed in any suitable manner.

Block S140 can include Block S144, which includes: generating a noise-reduced bioelectrical signal dataset. S144 is preferably performed before S140, but can alternatively be performed after. Producing one or more noise-reduced bioelectrical signal datasets preferably includes producing a noise-reduced EEG signal dataset, but can alternatively include producing noise-reduced bioelectrical signal datasets of any other suitable type. The noise-reduced bioelectrical dataset is preferably a common noise-reduced bioelectrical signal dataset (e.g., with common noise removed) but can alternatively be a dataset that is otherwise processed or noise-reduced.

Block S144 functions to process a bioelectrical signal dataset (e.g., an EEG signal dataset collected as in Block S120; an aggregated bioelectrical signal dataset, etc.) with a reference signal dataset (e.g., the averaged reference signal dataset as generated in Block S130, a common mode signal dataset collected as in Block S124, a DRL signal dataset, etc.) in order to remove noise from one or more bioelectrical signal datasets beyond that which was removed by referencing the collected bioelectrical signals to the averaged reference signal dataset.

Figure 15:
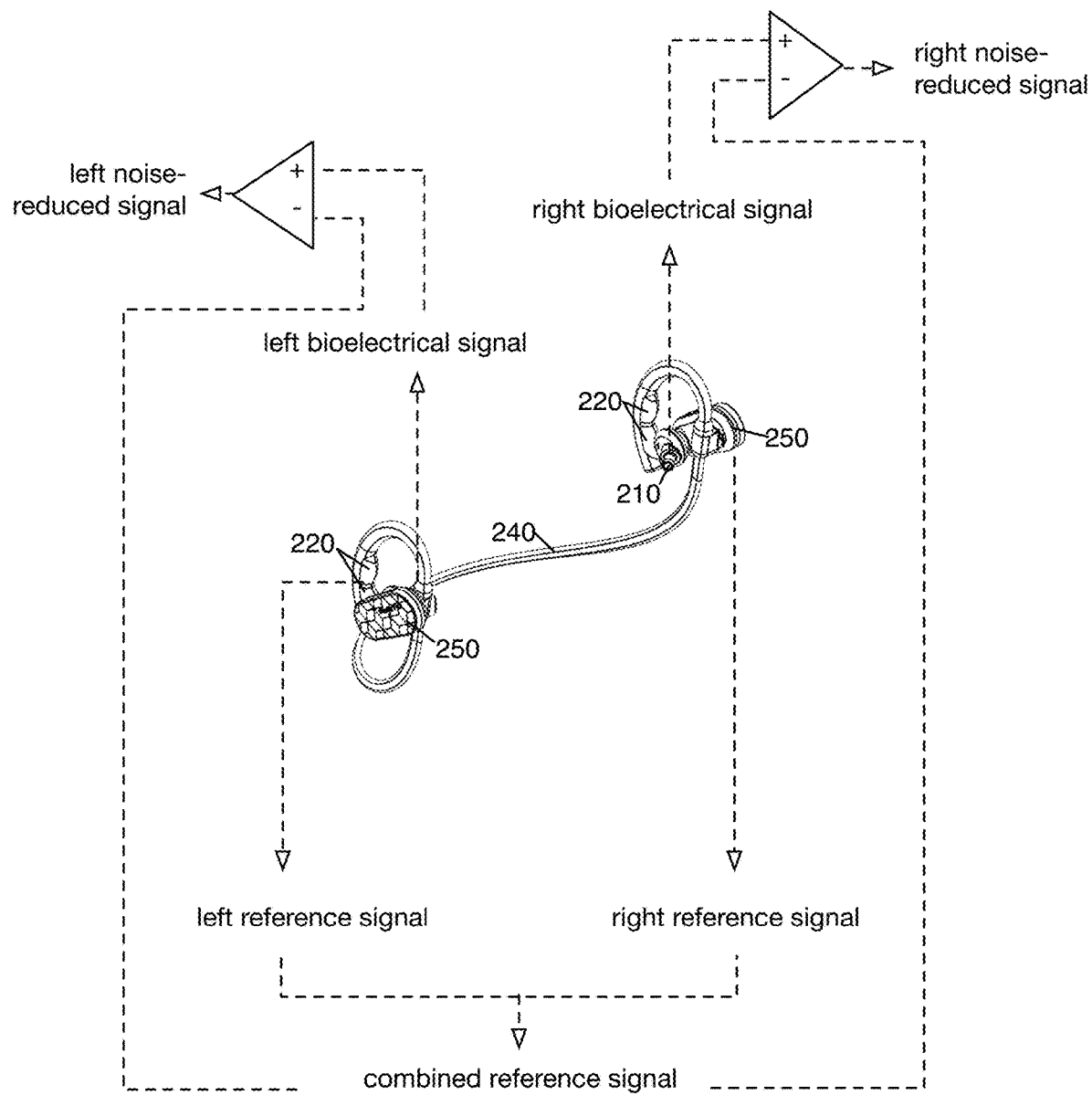
FIG. 15 is a schematic representation of an example of the method.

In one example, the noise-reduced bioelectrical signal dataset can be determined by subtracting the combined reference signal dataset from the left and/or right bioelectrical signal datasets, or be otherwise determined. In a specific example, a left noise-reduced dataset can be generated by subtracting the combined reference signal values (of the combined reference signal dataset) from left bioelectrical signal values (of the left bioelectrical dataset), wherein each combined reference signal value is subtracted from a left bioelectrical signal value sharing a timestamp (or has a substantially similar timestamp, within a margin of error) with the respective combined reference signal value (example shown in FIG. 15). This can be repeated with the right bioelectrical dataset and the combined reference signal dataset to generate a right noise-reduced dataset. However, the noise-reduced bioelectrical signal dataset can be otherwise determined.

The method can optionally include post-processing the noise-reduced bioelectrical signal dataset, which functions to further de-noise the bioelectrical signals. This can function to pick up individual noise characteristics, or which may enable derivation of channel specific noise. This is preferably performed after referencing the differential measurement (e.g., the bioelectrical signal dataset) to the averaged reference signal, based on individual reference signals. In such variations, Block S144 can result in determining individual noise characteristics (and, in examples, eliminating the determined noise characteristics from the bioelectrical signal dataset), and/or deriving channel specific noise characteristics (and, in examples, modeling the channel noise, eliminating the channel noise, compensating for the channel noise, etc.). However, a noise-reduced version of any suitable bioelectrical signal dataset and/or other dataset can be generated.

Post-processing one or more noise-reduced bioelectrical signal datasets preferably includes using one or more reference signals to filter, subtract, and/or otherwise eliminate noise present in one or more bioelectrical signal datasets. For example, producing a noise-reduced bioelectrical signal dataset can include reducing common mode noise (e.g., noise conducted on lines in the same direction). Additionally or alternatively, post-processing the noise-reduced bioelectrical signal datasets can include reducing differential mode noise (e.g., conducted on lines characterized by opposite directions), random noise, coherent noise, and/or any other suitable type of noise. Bioelectrical signal datasets can include various signal artifacts caused by user muscle motion; for example, muscle contraction and/or expansion can generate bioelectrical signals, which can occur near a bioelectrical sensor and induce a signal (e.g., a high amplitude signal) corresponding to the muscle contraction and/or expansion. In other examples, motion can cause movement of sensors (e.g., electrode contact points) across the skin and/or movement of the subcutaneous tissue beneath the sensor, which can also induce signal artifacts. Such signal artifacts can be removed via combination with reference signal datasets (e.g., in the analog domain, in the digital domain, etc.), source localization methods (e.g., independent components analysis), and/or other suitable signal processing techniques. In one example, post processing can be enhanced by considering contextual parameters, such motion sensor outputs or audio features (e.g., recorded by the microphone), which can apply context to the noise reduction algorithms (e.g. by adjusting thresholds for motion artifact cancellation in the EEG signal based on motion sensor outputs). However, reference signal datasets can be used in any suitable manner for reducing noise.

3.6 Controlling Operation of a User Device

Figure 3:
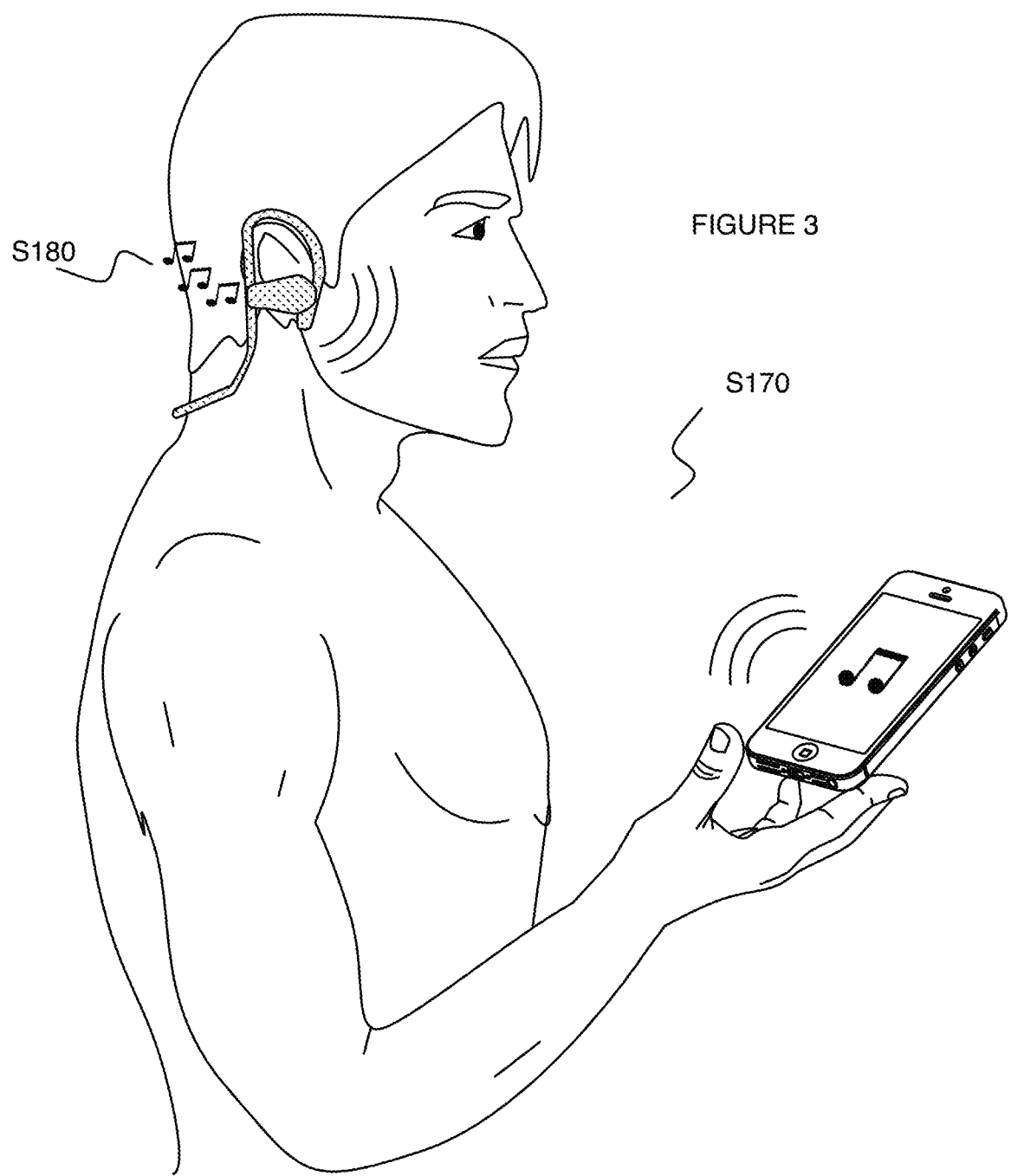
FIG. 3 depicts a schematic representation of an example of controlling a user device.

As shown in FIGS. 1 and 3, the method 100 can additionally or alternatively include Block S170, which recites: controlling operation of a user device. Block S170 functions to instruct a user device to perform one or more operations based on analysis of at least one of bioelectrical signal data (e.g., EEG signal data) and bioparameters derived therefrom collected in association with the biomonitoring neuroheadset. Controllable user devices preferably include the biomonitoring neuroheadset, a user device (e.g., a mobile computing device, a computer, etc.) in communication (e.g., wired communication, wireless communication, etc.) with the biomonitoring neuroheadset, and other suitable mobile devices, but can additionally or alternatively include a smart appliance (e.g., an internet-enabled television, video game console, cooking appliance, exercise device, etc.), and/or any other suitable device. In a specific example including control of the biomonitoring headset, the method 100 can include transmitting a combined audio and EEG processed dataset to a computing device of the user; generating, at a software component executing on the computing device, an analysis of an audio signal portion of the combined audio and EEG processed dataset; receiving, at the biomonitoring neuroheadset, operation instructions transmitted by the computing device and generated based on the analysis of the audio signal portion; and operating the biomonitoring neuroheadset based on the operation instructions. In a specific example including control of an external device using the biomonitoring headset, the method 100 can include transmitting an EEG processed dataset to a computing device of the user; generating, at a software component executing on the computing device, an analysis of the EEG processed dataset to extract a mental command; receiving, at an external device, operation instructions transmitted by the computing device and generated based on the mental command; and operating the external device based on the operation instructions (e.g., changing a musical track being played by the external device, turning on the power of the external device, turning off the power of the external device, etc.).

The EEG processed dataset can be associated with a cognitive state, a mental command, and/or any other suitable bioparameter (e.g., wherein the association between the EEG processed dataset and the bioparameter can be determined as disclosed herein, or otherwise determined). The bioparameter(s) can each be associated with one or more operation instructions, endpoints, and/or other output, which can enable the system to operate as a passive and/or active BCI (brain-computer interface). In an example of active BCI operation, the EEG processed dataset can be determined to be associated with a mental command, such as skipping to the next music track. In this first example, S170 can include controlling an endpoint (e.g., music player) to skip to the next music track. In an example of passive BCI operation, the EEG processed dataset can be determined to be associated with a mental or emotional state (e.g., fatigue), wherein S170 can include controlling a set of endpoints (e.g., coffee maker, computer, etc.) to perform operations associated with the mental or emotional state (e.g., controlling the music player to change the music to a high-BPM or high-energy genre, starting the coffee maker, sending a notification to the user's device to instruct the user to take a break or exercise; wherein the operations can be pre-associated with the mental or emotional state). However, S170 can be otherwise performed.

Regarding Block S170, controllable operations for a user device can include: power operations (e.g., turning on/off, charging, battery modes, etc.), data collection operations (e.g., controlling a biomonitoring neuroheadset to collect bioelectrical signal datasets, reference signal datasets, audio signal datasets, etc.), controlling applications executable on the user device (e.g., controlling applications related to alarm, navigation, weather, timer, user-downloaded applications, calls, voicemail, location, email, schedule, entertainment, health & fitness, news, social, music, messaging, communication, etc.), operating transceivers of the device (e.g., controlling a user device to transmit a dataset, configuring a user device to receive a dataset, etc.), and/or any other suitable operation associated with a user device. In a specific example, Block S170 can include controlling (e.g., using mental commands, using a microphone of the biomonitoring neuroheadset, using a combination of collected EEG data and auxiliary data, using pure EEG processed datasets, etc.), operations associated with a mobile computing device (e.g., smart phone) of a user, including at least one of: phone calling features, web meeting features, voice recording (e.g., voice memo) features, virtual assistant features, voice-to-text features, and/or any other suitable features associated with a mobile computing device. However, any suitable operation can be controlled with respect to any suitable user device.

In relation to Block S170, controlling operation of a user device is preferably based on, determined by, and/or derived from analysis of audio and/or bioelectrical signal data associated with the combined audio and bioelectrical signal processed dataset, but can additionally or alternatively be associated with any suitable dataset. Regarding analysis of audio data for controlling operation of a user device, analyses can include: speech recognition approaches (e.g., using Hidden Markov models, machine learning models such as those described in Section 4, neural networks, dynamic time warping, etc.), audio signal processing, and/or any other suitable analyses. Regarding analysis of bioelectrical signal data for controlling operation of a user device, analyses can include: bioelectrical signal processing (e.g., approaches described with respect to Block S130, S140, etc.), cognitive state metric analyses (e.g., as in Block S142), and/or any other suitable analyses for determining user intent based on bioelectrical signals. Additionally or alternatively, controlling operation of a user device can be based on any suitable data and/or approach. In a specific example, Block S170 can include: extracting audio features from audio signal data associated with a combined audio and bioelectrical signal dataset; extracting bioelectrical signal features from bioelectrical signal data associated with the combined audio and bioelectrical signal dataset; generating user device control instructions based on the extracted audio features and bioelectrical signal features; transmitting the control instructions to the user device (e.g., the user device for which the control instructions were generated), the control instructions configured to instruct operation of the user device.

However, controlling operation of a user device can be performed in any suitable manner.

3.8 Determining a Stimulus

As shown in FIGS. 1 and 3, the method 100 can additionally or alternatively include Block S180, which recites: determining a stimulus to modify the cognitive state of the user. Block S180 functions to determine a stimulative output that can be provided to the user in order to promote a therapy, facilitate physiological and/or psychological monitoring (e.g., a user response to the stimulus), provoke a desired reaction, and/or for any other suitable purpose. A stimulus in this context can include various stimuli and/or stimulative therapies, such as non-medical applications of a therapy, medical applications, self-improvement, training (e.g., physical training, mental training, etc.), wellness applications, and any other suitable applications related to provided stimuli. In variations, the stimulus can include an audio therapy, and providing the stimulus can include emitting, at a speaker of the biomonitoring neuroheadset, an audio sample. In such variations, Block S180 can function to output audio at one or more biomonitoring neuroheadset speakers to promote a therapy and/or facilitate physiological and/or psychological monitoring (e.g., a user response to the outputted audio) of the user. Determining a stimulus can include selecting, calculating, estimating, or otherwise determining the stimulus for any one or more of: promoting an audio, visual, haptic, and/or other suitable therapy (e.g., a cognitive behavioral therapy audio session, etc.), monitoring a user response to the therapy (e.g., monitoring a user response to an auditory component of media content that the user is engaging in, etc.), emitting an output (e.g., an audio sample, an image, a video sample, etc.) in response to user instruction (e.g., a user instructing that a particular song stored on the user's smartphone be played, etc.), and/or for any suitable purpose. Additionally or alternatively, S180 can include: providing a stimulus for any of the purposes disclosed above. In examples wherein determining the stimulus includes emitting an audio sample, emitting an audio sample can additionally or alternatively include selecting an audio sample to emit based on audio data and/or bioelectrical signal data (e.g., EEG signal data and/or bioparameters) associated with a dataset described in relation to any Blocks of the method 100, and/or any suitable dataset. However, determining a stimulus can be based on any suitable data.

In a variation of Block S180, determining a stimulus can be based on a cognitive state metric generated as in Block S142. For example, Block S180 can include determining an audio therapy to modify the cognitive state of the user, based on the cognitive state metric; and promoting, at a speaker of the biomonitoring neuroheadset, the audio therapy to the user. In a specific example, emitting an audio sample can include, in response to generating a cognitive state metric indicating a negative emotional state of the user, emitting an audio sample characterized by audio features configured to invoke a positive emotional state of the user. However, emitting an audio sample based on a cognitive state metric can be performed in any suitable manner. In another example, the cognitive state metric can be workplace productivity (e.g., focus metrics above a predetermined global, context-, task-, or user-specific threshold), stress reduction (e.g., stress metrics below a predetermined global, context-, task-, or user-specific threshold), distraction (e.g., distraction metrics below a predetermined global, context-, task-, or user-specific threshold), safety, and/or any other suitable cognitive state metric, wherein the stimulus can include triggers and/or alerts (e.g., audio, video, haptic stimulus, electric stimulus, etc.) output by the system and/or connected system (e.g., user device connected to the system).

In another variation of Block S180, determining a stimulus can additionally or alternatively include determining a stimulus based on one or more cardiovascular parameters (e.g., generated as described above). For example, determining a stimulus can include selecting an audio sample based on matching an audio feature (e.g., beats per minute, music genre, types of instruments, vocals, date of publication, audio waveform features, etc.) with a cardiovascular feature one or more cardiovascular parameters. In a specific example, for a user engaging in physical activity (e.g., jogging), determining a stimulus can include selecting a song with a beats per minute feature approximately matching a heart rate (e.g., an instantaneous heart rate, an average heart rate over a time period, etc.) of the user. In another example, an audio therapy can be selected and/or promoted based on a one or more cardiovascular features. For example, a soothing audio sample can be emitted at a speaker of a biomonitoring neuroheadset in response to generation of a cardiovascular parameter indicating a high cardiovascular risk (e.g., high blood pressure, increased heart rate, irregular heart rate, heart rate variability deviating beyond a predetermined global and/or user-specific range, etc.). However, emitting an audio sample based on one or more cardiovascular parameters can be performed in any suitable fashion.

In another variation of Block S180, determining a stimulus can based on data characterized by a plurality of data types (e.g., cardiovascular data, bioparameters generated as in Block S160, cognitive state data, EEG data, etc.) For example, emitting an audio sample can include selecting an audio sample based on an analysis of one or more cognitive state metrics (e.g., generated as in Block S142) and one or more cardiovascular parameters (e.g., generated as Block S164). In a specific example, the method 100 can additionally or alternatively include generating a cognitive state metric based on EEG data associated with a combined audio and EEG dataset; generating a cardiovascular parameter based on the EEG data associated with the combined audio and EEG dataset; identifying one or more target health statuses (e.g., a psychological state, a physiological state) based on the cognitive state metric and the cardiovascular parameter; and emitting an audio sample configured to facilitate user achievement of the one or more target health statuses. In another specific example, the method 100 can include identifying a stressed user state based on a cognitive state metric (e.g., a metric indicating emotions of frustration) and a cardiovascular parameter (e.g., a high blood pressure); selecting an audio sample including audio features associated with a relaxed emotional state; and emitting the audio sample at one or more speakers of a biomonitoring neuroheadset. However, emitting an audio sample based on data typified by a plurality of data types can be performed in any suitable manner.

Regarding Block S180, in variations, Blocks S120, S124, S130, S140 and/or other suitable portions of the method 100 can be performed contemporaneously with, in parallel with, serially, and/or in response to emitting an audio sample at a speaker of the biomonitoring neuroheadset S180. In a specific example, the method 100 can include, in response to promoting an audio therapy to the user at the speaker: collecting, at a first EEG sensor, a second EEG signal dataset (e.g., where the first EEG signal dataset was collected prior to emission of the audio therapy) from the user during a second time period (e.g., where the first time period corresponded to collection of the first EEG dataset); collecting, at the first common mode sensor, a second common mode signal dataset (e.g., where the first common mode signal dataset was collected during the first time period) contemporaneously with collecting the second EEG signal dataset during the second time period; collecting, at the microphone, a second audio signal dataset (e.g., where the first audio signal dataset was collected during the first time period) from the user contemporaneously with collecting the second EEG signal dataset and the second common mode signal dataset during the second time period; and generating a second combined audio and EEG processed dataset based on the second EEG signal dataset, the second common mode signal dataset, and the second audio signal; and generating a second cognitive state metric based on the second combined audio and EEG processed dataset, wherein the second cognitive state metric indicates a cognitive state response to the audio therapy during the second time period. However, Block S180 can have any suitable relationship with other portions of the method.

With respect to temporal aspects relating to Block S180, emitting an audio sample is preferably performable in real-time or near real-time. For example, emitting an audio sample can be performed during a time period in which bioelectrical signal data and/or audio signal data triggering the emission of the audio sample (e.g., audio signal data including user speech instructions for the emission of a specified audio sample) were collected. Additionally or alternatively, emitting an audio sample can be performed at any suitable time in relation to portions of the method 100, and/or at any suitable time.

However, emitting an audio sample at one or more speakers of the biomonitoring neuroheadset S180 can be performed in any suitable fashion.

3.9 Additional Blocks

As shown in FIG. 1, the method 100 can additionally or alternatively include Block S150, which recites: monitoring contact quality of the at least one or more sensors. Block S150 functions to facilitate high quality sensor signals through adequate coupling between the user and one or more sensors of a biomonitoring neuroheadset. Contact quality is preferably monitored for one or more bioelectrical signal sensors (e.g., contact quality between an EEG sensor and an ear canal region) and/or reference signal sensors (e.g., contact quality between a common mode sensor and an ear region proximal the temporal bone; contact quality between a DRL electrode and an ear region proximal the temporal bone, etc.). However, monitoring contact quality can be performed for any suitable sensor; contact quality is preferably monitored for each and every sensor independently, but can additionally or alternatively be monitored for all of the sensors collectively, subgroups of sensors, or otherwise suitably monitored. Monitoring contact quality is preferably performed for a sensor with a target position proximal an ear region of a user, but can additionally or alternatively be performed for sensors with target positions at any suitable anatomical position of a user. However, monitoring contact quality can be performed for any suitable sensor at any suitable location.

Contact quality monitoring is preferably performed substantially as described in U.S. patent application Ser. No. 15/209,582, filed 13 Jul. 2016, which is incorporated in its entirety herein by this reference. Additionally or alternatively, Block S150 can include any elements described in U.S. patent application Ser. No. 12/270,739, filed 13 Nov. 2008, which is herein incorporated in its entirety by this reference. However, Block S150 can be performed in any suitable manner.

The method 100 can additionally or alternatively include Block S135, which recites: determining auxiliary data. Auxiliary data is preferably determined at the biomonitoring headset, but can additionally or alternatively be determined at any suitable location. Auxiliary data preferably includes audio data, and is preferably collected by a microphone of the biomonitoring headset, but can additionally or alternatively include any suitable type of data local to the biomonitoring headset (e.g., video data collected by a video camera, temperature data collected by a thermometer, motion data collected by an accelerometer, GPS data collected by a connected user device, social media activity, calendar activity, user event occurrence, etc.). Examples of user events can include: attendance at a concert, watching or participating in a sporting event, watching broadcast media contemporaneously with other users, or any other suitable event. The auxiliary data gathered in Block S135 can, in variations, form the basis in whole or part for any of the analyses previously described (e.g., determining a cognitive state metric for the user).

The method 100 can, however, include any other suitable blocks or steps configured to collect, monitor, and/or analyze bioelectrical and audio signals of a user with a biomonitoring neuroheadset.

4. System

Figure 4A:
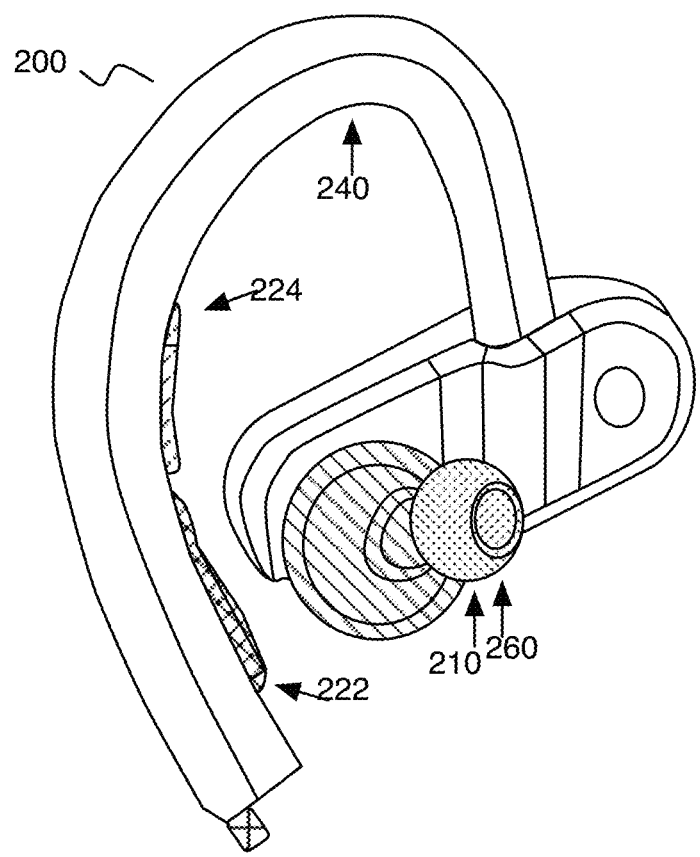
FIGS. 4A-4B depict variations of an embodiment of a system for detecting bioelectrical signals of a user.
Figure 4B:
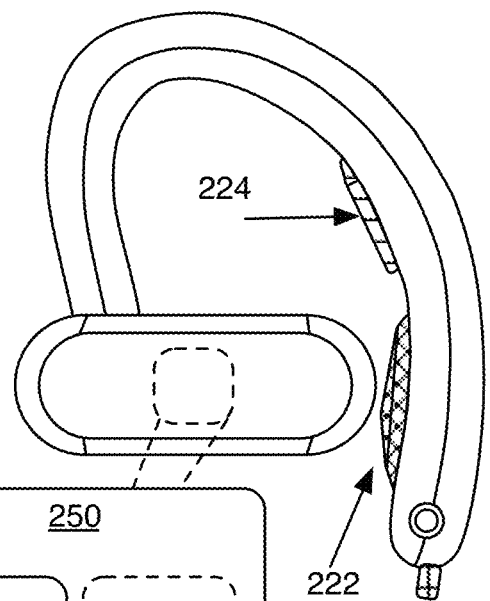
Figure 4B:
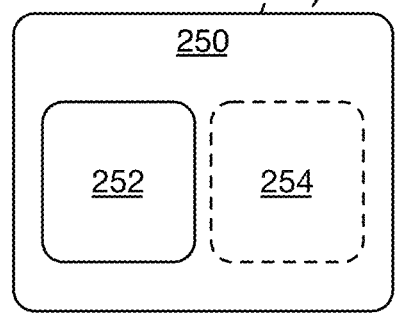

As shown in FIGS. 4A-4B, an embodiment of a system 200 for detecting bioelectrical signals and audio signals from a user includes: one or more bioelectrical signal sensors 210 configured to collect bioelectrical signal data from the user; a noise reduction subsystem 220 including one or more reference sensors configured to collect reference signal data contemporaneously with the collection of bioelectrical signal data; an auxiliary sensor (e.g., microphone(s), touch input(s), camera(s), kinematic sensor(s), and/or any other suitable sensor) 230 configured to collect an auxiliary signal dataset (e.g., an audio signal dataset, a visual dataset) from the user contemporaneously with the collection of the first bioelectrical signal dataset and the reference signal dataset; a wearable support frame 240 worn at a head region of the user, the wearable support frame 240 supporting and physically connecting the one or more bioelectrical sensors 210 and the one or more reference sensors; and an electronics subsystem 250 including a processing module 252 configured to produce a noise-reduced bioelectrical dataset from processing the bioelectrical signal data with the reference signal data, and to produce a conditioned audio signal dataset from processing the audio signal dataset for transmission with the noise-reduced bioelectrical signal dataset, the electronics subsystem 250 electronically connected to the one or more bioelectrical signal sensors 210, the noise reduction subsystem 220, and the microphone 230.

In some variations, the system 200 can additionally or alternatively include a communications module 254, a speaker 260, a remote processing module 270, and/or a screen (e.g., a sleeve, an electromagnetic shield, an insulator layer, etc.) separating bioelectrical sensor power wire(s) from microphone power wire(s) to facilitate prevention of cross-talk between corresponding signal data. As shown in FIGS. 6-10, in specific examples of configurations of the system 200, components of the biomonitoring neuroheadset and/or other devices can communicate amongst each other and/or the user.

In some variations, the system 200 can include multiple instances of the various components arranged in a bilateral configuration. In such variations, embodiments of the system 200 can be worn in a similar manner as a pair of headphones having a connection (e.g., a frame or other support structure) that connects the bilaterally-arranged components (e.g., behind the head, beneath the chin, etc.). For example, as shown in FIGS. 13A-13C, the system can include a pair of substantially mirror-imaged modules that are connected by a semi-rigid support structure, wherein each module includes an instance of the bioelectrical sensor 210, the processing unit 250, and the reference sensor(s) 220. Additionally or alternatively, the modules can be connected by flexible wire, and/or be connected wirelessly. In the latter example, each module can collect biosignals independently, and distribute (e.g., to other modules of the system) and collect audio signals (e.g. music, microphone signals) in a synchronized manner.

In some variations, the system 200 and/or components of the system 200 can additionally or alternatively include or communicate data to and/or from: a user database (storing user account information, user profiles, user health records, user demographic information, associated user devices, user preferences, etc.), an analysis database (storing computational models, collected datasets, historical data, public data, simulated data, generated data, generated analyses, diagnostic results, therapy recommendations, etc.), and/or any other suitable computing system.

Examples of system form factors include: headphones, ear buds, eye glasses, helmets, caps, and/or any other suitable form factor.

Figure 6:
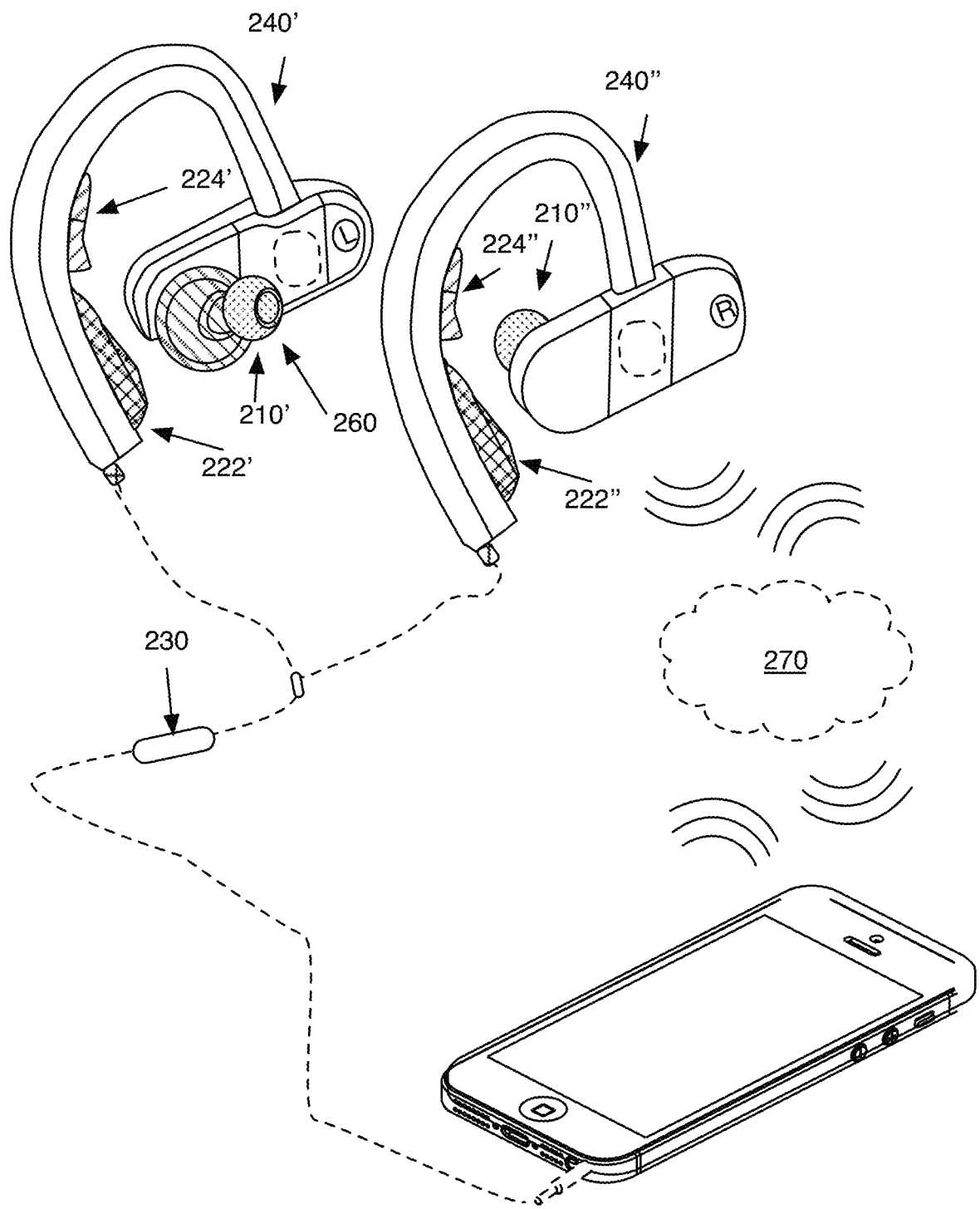
FIG. 6 depicts a graphical representation of a variation of an embodiment of the system.

Database(s) and/or portions of the method 100 can be entirely or partially executed, run, hosted, or otherwise performed by: a remote computing system (e.g., a server, at least one networked computing system, stateless computing system, stateful computing system, etc.), a biomonitoring neuroheadset (e.g., a processing module 252 of a biomonitoring neuroheadset), a user device, a machine configured to receive a computer-readable medium storing computer-readable instructions, or by any other suitable computing system possessing any suitable component (e.g., a graphics processing unit, a communications module 254, etc.). As shown in FIG. 6, in specific examples, the system 200 can include a remote processing module 270 remote from the one or more bioelectrical signal sensor 210, the noise reduction subsystem, the microphone, the wearable support frame, and the electronics subsystem 250. In these specific examples, the remote processing module 270 can be configured to identify a blood flow time-varying oscillation in noise-reduced values of a noise-reduced EEG dataset; and estimate at least one of a heart rate and a heart rate variability based on the blood flow time-varying oscillation in noise-reduced values. In these examples and related examples, the remote processing module 270 can be configured to separate cardiac data (e.g., heartbeat data, pulse data, etc.) embedded in EEG data from EEG signals originating from neural activation, and/or otherwise suitably determine cardiac data (e.g., via ECG monitoring, pulse oximetry, etc.). Additionally or alternatively, the remote processing module 270 can be configured to perform any suitable portion of the method 100. However, the components of the system 200 can be distributed across machine and cloud-based computing systems in any other suitable manner.

Figure 7:
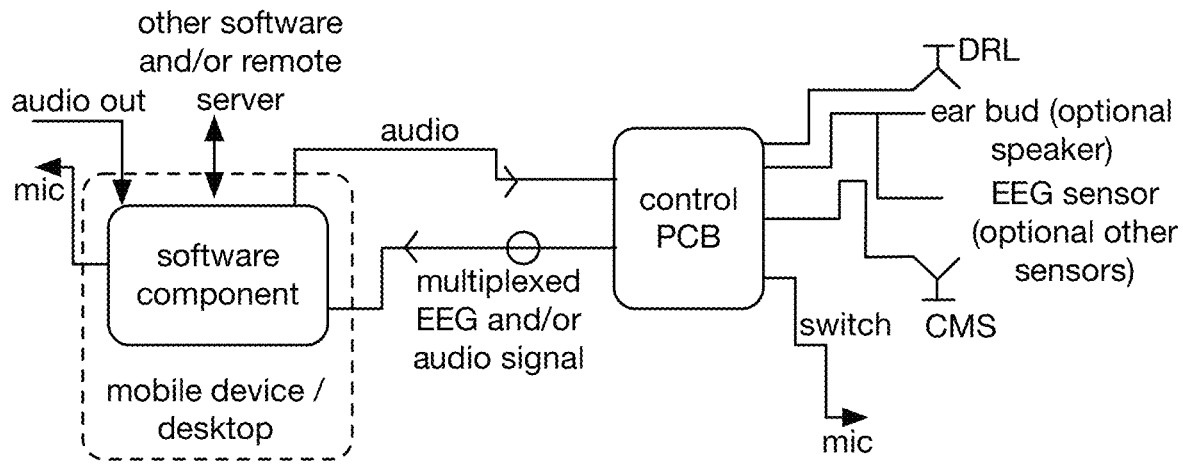
FIG. 7 depicts a block diagram of a variation of an embodiment of the system.
Figure 8:
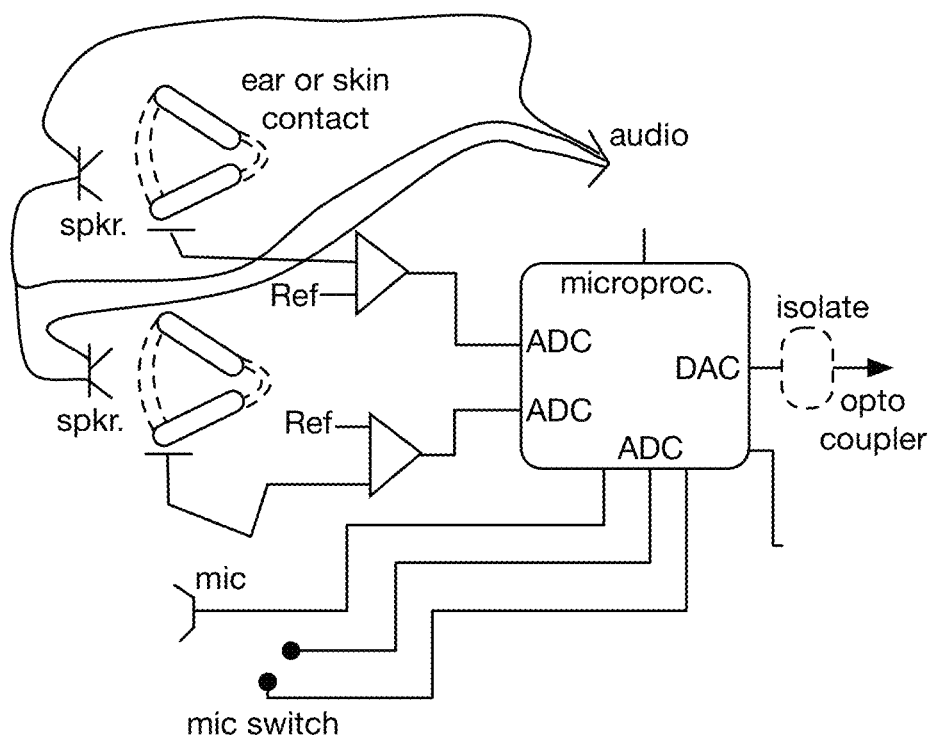
FIG. 8 depicts a block diagram of a variation of an embodiment of the system.
Figure 9:
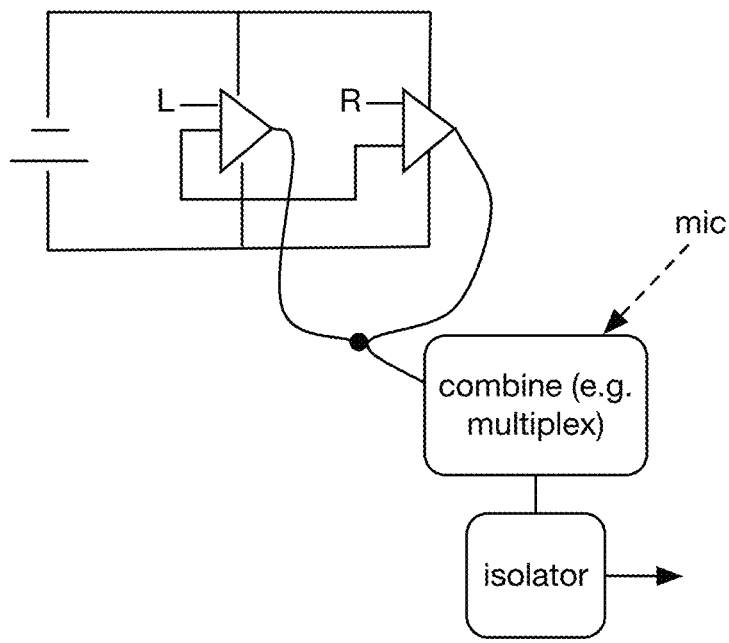
FIG. 9 depicts a block diagram of a variation of an embodiment of the system.

Devices implementing at least a portion of the method 100 can include one or more of: a biomonitoring neuroheadset, smartwatch, smartphone, a wearable computing device (e.g., head-mounted wearable computing device), tablet, desktop, a supplemental biosignal detector, a supplemental sensor (e.g., motion sensors, magnetometers, audio sensors, video sensors, location sensors a motion sensor, a light sensor, etc.), a medical device, and/or any other suitable device. All or portions of the method 100 can be performed by one or more of: a native application, web application, firmware on the device, plug-in, and any other suitable software executing on a device. Device components used with the method 100 can include an input (e.g., keyboard, touchscreen, etc.), an output (e.g., a display), a processor, a transceiver, and/or any other suitable component, wherein data from the input device(s) and/or output device(s) can be generated, analyzed, and/or transmitted to entities for consumption (e.g., for a user to assess their bioparameters) Communication between devices and/or databases can include wireless communication (e.g., WiFi, Bluetooth, radiofrequency, etc.) and/or wired communication. As shown in FIGS. 6-7, in variations, communication can be between an electronics subsystem 250 of a biomonitoring neuroheadset and a computing device executing a software component. In variations including wired communication between components of the system 200, the system 200 can additionally or alternatively include a screen (e.g., separating power wires in a cable) configured to prevent cross-talk between collected signals. In a specific example, the system 200 can include: a cable connecting the processing module 252 to one or more EEG sensors 210 and the microphone; an EEG sensor power wire for the one or more EEG sensors, the EEG sensor power wire positioned within the connecting cable; a microphone power wire for the microphone, the microphone power wire positioned within the connecting cable; and a screen separating the EEG sensor power wire from the microphone power wire within the connecting cable, the screen configured to facilitate prevention of cross-talk between the first EEG signal dataset and the audio signal dataset. However, communication between components of the system and/or other devices can be configured in any suitable manner.

Components of the system 200 (e.g., a processing module 252 of an ultrasound system) and/or any other suitable component of the system 200, and/or any suitable portion of the method 100 can employ machine learning approaches including any one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each processing portion of the method 100 can leverage: regression, classification, neural networks (e.g., CNNs, DNNs, etc.), sensor fusion, rules, heuristics, equations (e.g., weighted equations, etc.), selection (e.g., from a library), instance-based methods (e.g., nearest neighbor), regularization methods (e.g., ridge regression), decision trees, Bayesian methods (e.g., Naïve Bayes, Markov), kernel methods, probability, deterministics, genetic programs, support vectors, or any, or any other suitable module leveraging any other suitable computation method, machine learning method, or combination thereof.

One or more bioparameter models can be concurrently generated, updated, or otherwise created. When the system includes multiple candidate bioparameter models (e.g., for a given bioparameter, for a set of bioparameters, etc.), one or more bioparameter models can be selected from the candidate bioparameter model set for use. The candidate bioparameter model can be selected based on: a test data set (e.g., of bioelectrical data and/or supplemental data, associated with a known bioparameter), consensus between the candidate bioparmaeter models, any one element or any combination of elements (eg. groups of feature sets) derived from EEG, ECG, EOG, EMG, GSR, motion, GPS, audio and voice signals, sentiment analysis, image and video analysis or any other contemporaneous or contextual information, or otherwise determined.

4.1 Bioelectrical Signal Sensor

The system 200 can include one or more bioelectrical signal sensors 210, which function to collect bioelectrical signal data from the user. The one or more bioelectrical signal sensor 210 can include one or more bioelectrical signal sensor 210 configured to detect any one or more of: EEG signals, EOG signals, EMG signals, ECG signals, GSR signals, MEG signals, and/or any other suitable signals. Bioelectrical signals can be collected by the one or more bioelectrical signal sensor 210 at any suitable time period. For example, a set of EEG sensors 210 can collect EEG signal datasets contemporaneously during a time period with a set of ECG sensors collecting ECG signal datasets. However, the one or more bioelectrical signal sensor 210 can be configured to collect any suitable signal at any suitable time.

The one or more bioelectrical signal sensor 210 are preferably positioned proximal an ear canal region (e.g., left ear canal, right ear canal) of an ear region of the user, but can additionally or alternatively be positioned at, proximal to, adjacent to, near, distance, and/or with any suitable positional relationship to any suitable ear subregion of an ear region of the user, and/or any suitable anatomical location of the user. In an example, one or more bioelectrical signal sensor 210 can be embedded within in-ear headphones (e.g., used for emitting audio) or on-ear headphones of a biomonitoring neuroheadset. However, bioelectrical signal sensor 210 can be positioned at any suitable location of a biomonitoring neuroheadset.

As shown in FIG. 6, in a variation of the one or more bioelectrical signal sensors 210, the system 200 can include a plurality of EEG sensors 210'. For example, the system 200 can include a first EEG sensor 210' positioned proximal an ear canal (e.g., left ear canal) of the user, the first EEG sensor 210' configured to collect a first EEG signal dataset from the user during a time period; and a second EEG sensor 210" positioned proximal a contralateral ear canal (e.g., a right ear canal) of the user, the second EEG sensor 210" configured to collect a second EEG dataset from the user during the time period. In another example, the first EEG sensor is positioned proximal an elastic cartilage section of the ear canal, and the second EEG sensor is positioned proximal an elastic cartilage section of the contralateral ear canal. Additionally or alternatively, EEG sensors can be positioned on an external ear flap, in the cartilaginous chamber around the ear canal, or within the ear canal. Additionally or alternatively, one or more EEG sensors can be positioned within, proximal, touching, and/or adjacent to the middle ear and/or inner ear of either the left and/or right ear region. However, the system 200 can include any suitable configuration of a set of EEG sensors 210.

Additionally or alternatively, bioelectrical signal sensor 210 can include any elements described in U.S. application Ser. No. 13/903,832, filed 28 May 2013, and U.S. patent application Ser. No. 14/447,326 filed 30 Jul. 2014, which are each herein incorporated in their entirety by this reference. However, bioelectrical signal sensors 210 can be configured in any suitable fashion.

4.2 Noise Reduction Module

The system 200 can include a noise reduction module 220 including one or more reference sensors. The noise reduction module 220 functions to employ one or more reference sensors to collect reference signal data for reducing noise associated with collected bioelectrical signal datasets. A noise reduction module 220 preferably includes one or more common mode sensors 222, but can additionally or alternatively include one or more DRL electrodes 224 and/or any other suitable reference sensors.

In relation to reference sensors of the reduction module 220, reference sensors are preferably positioned proximal an ear region of a user (e.g., a temporal bone of a user), but can additionally or alternatively be positioned at, proximal to, adjacent with, and/or distant from any suitable anatomical location of the user. In an example, the system 200 can include a noise reduction subsystem including a reference sensor positioned proximal a mastoid process of a temporal bone proximal the ear canal, the reference sensor configured to collect a reference signal dataset contemporaneously with collection of an EEG signal dataset (e.g., by one or more bioelectrical signal sensor 210) during a first time period. In this example, the reference sensor can be a first common mode sensor 222, where the reference signal dataset is a first common mode signal dataset, where the noise reduction subsystem can further include a driven right leg module positioned proximal the first common mode sensor 222 and the mastoid process of the temporal bone. In this example, the noise reduction subsystem can further include a second common mode sensor 222 positioned proximal a contralateral mastoid process of a contralateral temporal bone proximal the contralateral ear canal, the second common mode sensor 222 configured to collect a second common mode signal dataset. However, reference sensors of the noise reduction module 220 can be configured in any suitable manner.

In a variation of the noise reduction module 220, a set of reference sensors can include, for each ear, one or more common mode sensors 222 and one or more DRL electrodes 224 positioned proximal the ear. In a specific example, for a given ear of the user, a corresponding common mode sensor 222 can be positioned proximal a different ear subregion (e.g., a different part of the ear flap) than the corresponding DRL electrode 224. In another variation of the noise reduction module 220, only one type of reference sensor can correspond to an ear of the user. For example, a common mode sensor 222 can be characterized with a primary reference location behind the left ear flap, and a driven right leg sensor can be characterized with a feedback reference location behind a right ear flap. However, any suitable combination of reference sensor types can be arranged at any suitable ear region of a user.

Additionally or alternatively, the noise reduction module 220 can include any elements described in U.S. patent application Ser. No. 14/447,326, filed 30 Jul. 2014, which is hereby incorporated in its entirety by this reference. However, the noise reduction module 220 and the one or more reference sensors can be configured in any suitable fashion.

4.3 Auxiliary Sensor

The system 200 can include one or more auxiliary sensors 230, which function to collect an auxiliary signal dataset from the user for use in determining a psychological and/or physiological state of the user. The one or more auxiliary sensors 230 are preferably microphones, but can additionally or alternatively be any other suitable sensor. In cases wherein the auxiliary sensors 230 are microphones 230, the microphones can be typified by one or more microphone types including dynamic, ribbon, carbon, piezoelectric, condenser, fiber optic, laser, liquid, microelectromechanical systems (MEMS), and/or any other suitable microphone type. The one or more microphones 230 can include any suitable capsule (e.g., with respect to geometry, form, orientation, size, weight, color, materials, etc.) for housing the electrical components of the microphone 230. As shown in FIG. 6, in variations examples, the microphone 230 can be embedded with volume controls for adjusting volume of a speaker 260 of the biomonitoring neuroheadset and/or other suitable component. As shown in FIG. 5B, the microphone 230 can otherwise be omitted from the system 200.

The microphone 230 is preferably configured to collect one or more audio signal datasets from the user contemporaneously with collection of one or more bioelectrical signal datasets and/or reference signal datasets (e.g., during a time period). However, the microphone 230 can be configured to perform any suitable operation.

The microphone 230 is preferably in communication (e.g., wired communication, wireless communication) with a processing module 252 of an electronics subsystem 250 of the biomonitoring neuroheadset, but can additionally or alternatively possess a communication link with any other suitable component of the biomonitoring neuroheadset, the system 200, and/or another device.

Figure 5A:
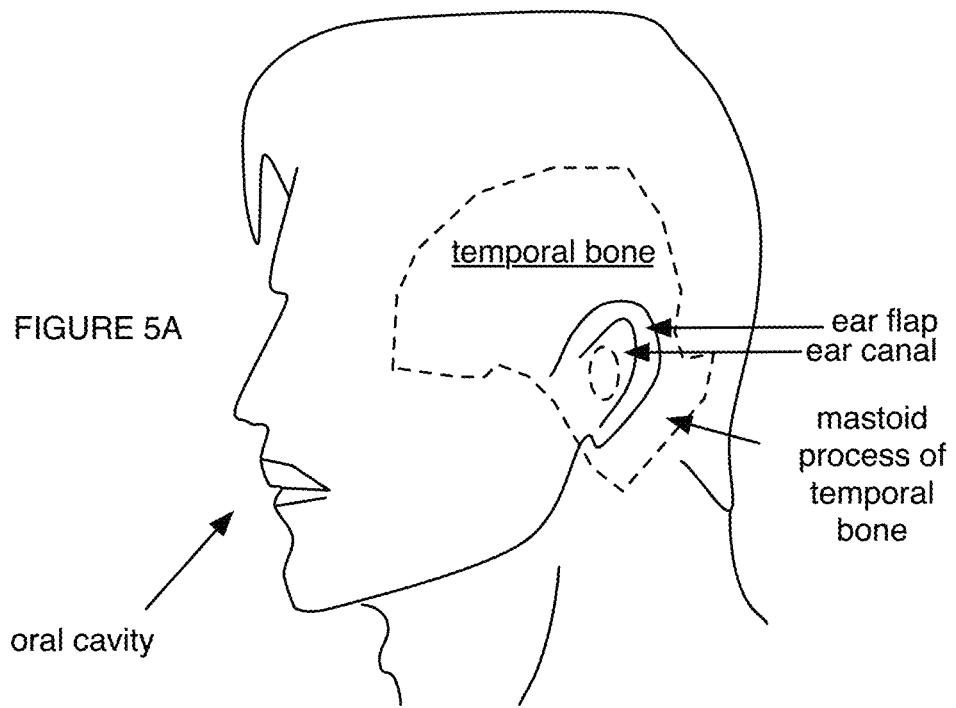
FIGS. 5A-5C depict graphical representations of user anatomical regions and variations of an embodiment of the system.
Figure 5B:
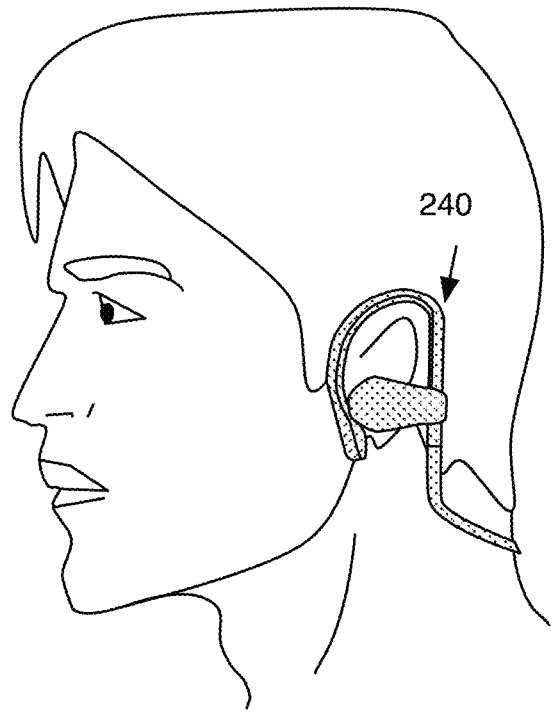
Figure 5C:
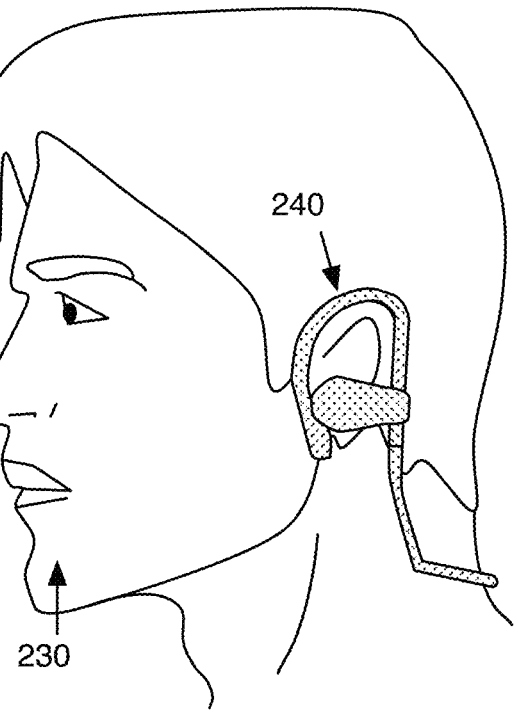

As shown in FIGS. 5A and 5C, the microphone 230 is preferably positioned proximal an oral cavity of the user, but can additionally or alternatively be positioned at, proximal to, adjacent to, near, far, and/or with any suitable positional relationship to any anatomical position of the user and/or component of the biomonitoring neuroheadset.

However, the microphone 230 can be configured in any suitable manner.

4.4 Wearable Support Frame

The system 200 can include one or more wearable support frames 240, which function to provide support for components of the biomonitoring neuroheadset. The one or more wearable support frames 240 preferably support and/or physically connect one or more bioelectrical signal sensor 210 and/or one or more reference sensors. The wearable support frame 240 can possess any suitable dimensions (e.g., width, length, height, surface area, volume, aspect ratio, curvature, etc.). The wearable support frame 240 can include any suitable three-dimensional shapes including: a prism, cube, cylinder, sphere, and/or any suitable three-dimensional shape. The shape of a surface of the wearable support frame 240 can include: a rectangle, square, circle, triangle, polygon, and/or other suitable shape. As shown in FIGS. 4A-4B, 5B-5C, and 6, a wearable support frame 240 can include a primary curvature forming a hook configured to hook around an ear of a user, the ear region supporting the wearable support frame 240 on the user. However, one or more wearable support frames 240 can possess any suitable form.

One or more wearable support frames 240 are preferably worn at a head region, but can additionally or alternatively be worn at any suitable anatomical position (e.g., chest region, bones, forehead, etc.) for facilitating mechanical retention of the biomonitoring device to the user. The wearable support frame 240 is preferably mechanically supported at an ear region of the user. In a specific example, the system 200 can include a wearable support frame 240 worn at a head region of the user and cooperatively supported at an ear region proximal the temporal bone and an ear flap of the user, the wearable support frame 240 supporting and physically connecting the EEG sensor 210 and the reference sensor. However, one or more wearable support frames 240 can be positioned at any suitable location and supported by any suitable body region and/or component.

Figure 12:
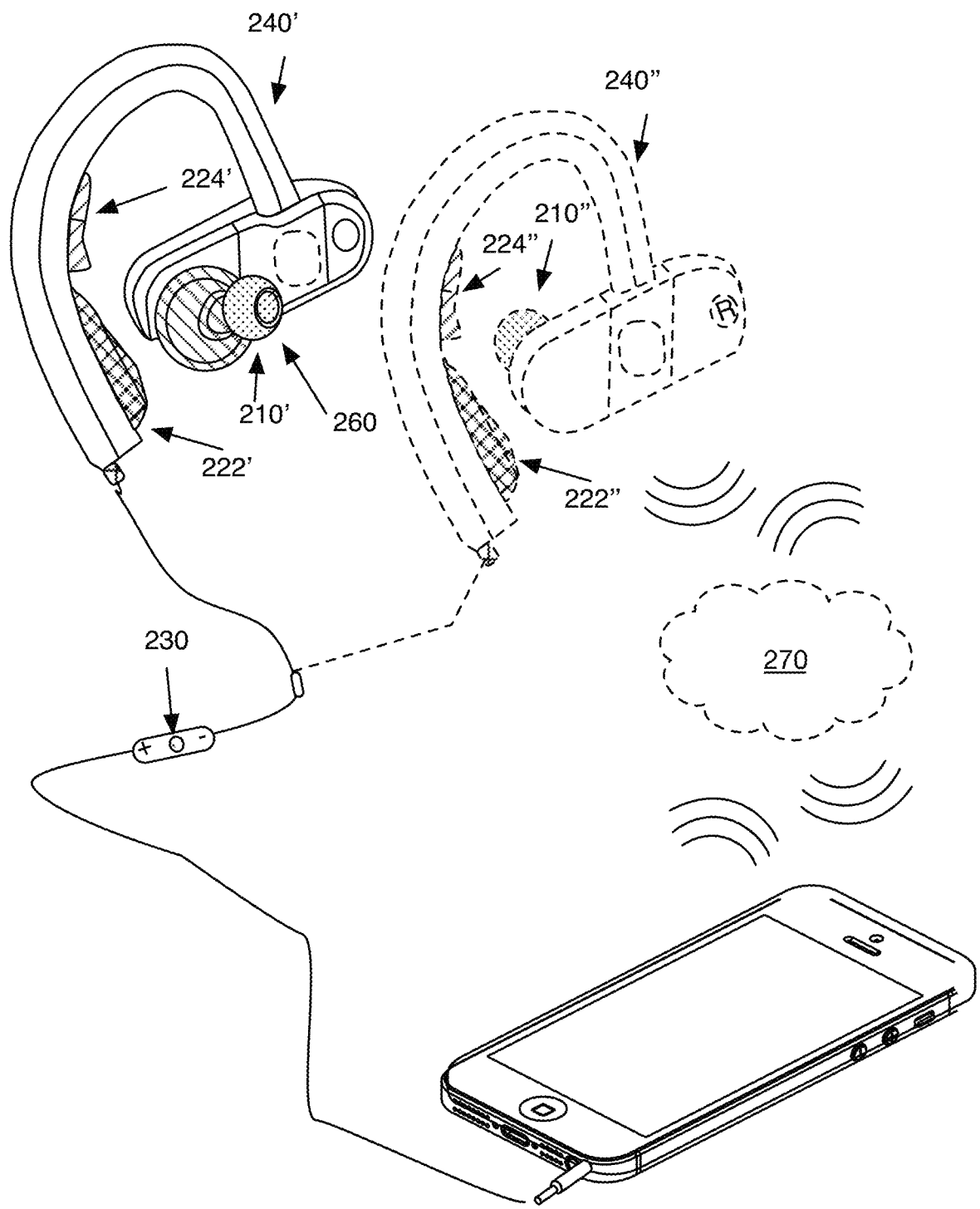
FIG. 12 depicts a graphical representation of a variation of an embodiment of the system.

As shown in FIG. 6, in a variation, the system 200 includes a plurality of wearable support frames 240. For example, the system 200 can include a first wearable support frame 240' cooperatively supported at an ear region, the first wearable support frame 240' supporting and physically connecting a first EEG sensor, a first common mode sensor 222', and a first DRL electrode 224' of a DRL module; and a second wearable support frame 240" cooperatively supported at a contralateral ear region, the second wearable support frame 240" supporting and physically connecting a second EEG sensor, a second common mode sensor 222", and a second DRL electrode 224" of a DRL module. Alternatively, as shown in FIG. 12, a biomonitoring neuroheadset can include only a single wearable support frame configured to be worn at a single ear region (e.g., a left ear region or a right ear region) of a user.

However, the one or more wearable support frames 240 can be configured in any suitable fashion.

4.5 Electronics Subsystem

As shown in FIG. 4B, the system 200 can include an electronics subsystem 250, which functions to receive, process, and/or transmit signals collected by one or more bioelectrical signal sensor 210, reference sensors, and/or a microphone 230. The electronics subsystem 250 can additionally or alternatively include a processing module 252 and/or a communications module 254. However, the electronics subsystem 250 can include any other suitable modules configured to facilitate signal reception, signal processing, and/or data transfer in an efficient manner.

The electronics subsystem 250 is preferably electronically connected to the one or more bioelectrical signal sensors 210, the noise reduction subsystem 220, and the microphone 230, but can additionally or alternatively be connected (e.g., wired connection, wireless connection) to any suitable component of the biomonitoring neuroheadset, and/or any suitable component.

Components of the electronics subsystem 250 are preferably embedded within one or more wearable support frames 240 of the biomonitoring neuroheadset, but can be otherwise located at the biomonitoring neuroheadset and/or other component.

However, the electronics subsystem 250 can be configured in any suitable manner.

4.5.A Processing Module

As shown in FIG. 4B, the electronics subsystem 250 can include a processing module 252 functioning to process collected and/or received datasets. The processing module 252 can additionally or alternatively function to control notifications to a user, generate a bioparameter, generate operation instructions for a user device, and/or perform any other suitable operations related to the method 100. The processing module 252 can include one or more: microcontrollers, central processing units (CPU), a microprocessors, digital signal processors (DSP), a state machine, an application-specific integrated circuit (ASIC), a programmable logic device (PLD), a field programmable gate array (FPGA), a graphics processing unit (GPU), any other suitable processing device. The processing module 252 preferably includes one or more printed circuit boards (PCBs), which can preferably satisfy the data collection and/or processing requirements associated with the method 100. In a specific example, the electronics subsystem 250 includes a control PCB embedded in a wearable support frame 240 configured to hook onto an ear region of the user. In another specific example, the electronic subsystem includes a set of daughter PCBs, where at least one daughter PCB is embedded in each of a plurality of wearable support frames 240 (e.g., a wearable support frame 240 for each ear). In another specific example, the electronics submodule can include a first processing submodule (e.g., a control PCB, a daughter PCB, etc.) positioned proximal a first EEG sensor, and a second processing submodule (e.g., a control PCB, a daughter PCB, etc.) positioned proximal a second EEG sensor. However, the processing module 252 can include any suitable components.

Figure 10:
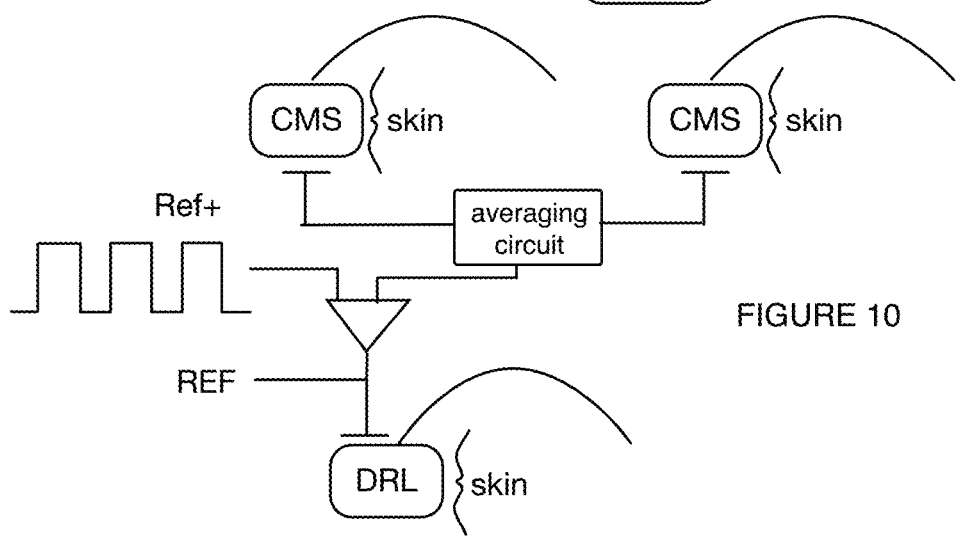
FIG. 10 depicts a block diagram of a variation of an embodiment of the system.
Figure 11:
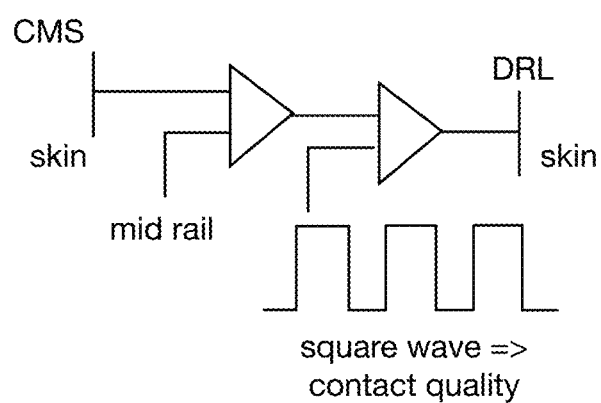
FIG. 11 depicts a block diagram of a variation of an embodiment of the system including contact quality monitoring.

The processing module preferably includes an averaging circuit, which functions to produce an averaged reference signal dataset from processing multiple reference signals (e.g., CMS signals, DRL signals, etc.), such that bioelectrical signal datasets can be referenced against the averaged reference signal dataset. The averaging circuit can be implemented as an analog averaging circuit in accordance with known analog signal processing methodologies, and/or as a digital averaging circuit (e.g., within a microcontroller of the processing module). In a specific example, the averaging circuit averages the first and second reference signal datasets to generate an averaged reference signal dataset, and two or more bioelectrical signal datasets are each referenced against the averaged reference signal dataset (e.g., as a differential voltage measurement). In another specific example, as shown in FIG. 10, the averaging circuit combines the outputs of a plurality of CMS sensor modules to generate the averaged reference signal dataset, which is subsequently passed into an amplifier for downstream processing. However, the averaging circuit can additionally or alternatively include any other suitable components, and/or be otherwise suitably implemented to generate the averaged reference signal dataset.

The averaging circuit can be implemented as a fully analog circuit, a fully digital circuit, fully in software, and/or any suitable combination of the aforementioned.

The processing module 252 is preferably configured to produce a noise-reduced EEG dataset from processing one or more EEG signal datasets with one or more reference signal datasets, and to produce a conditioned audio signal dataset from processing one or more audio signal datasets for transmission with the noise-reduced EEG dataset. The processing module 252 can be additionally or alternatively configured to control data collection parameters for collection of bioelectrical signal datasets, reference signal datasets, and/or audio signal datasets. Data collection parameters can include: sampling frequency, time of sampling, time between samples, amount of data to collect, types of data to collect, conditions for triggering collection, voltage resolution, voltage amplitude, signal dynamic range, and/or any suitable data collection parameter. However, the processing module 252 can be configured to perform any suitable portion of the method 100.

Figure 14:
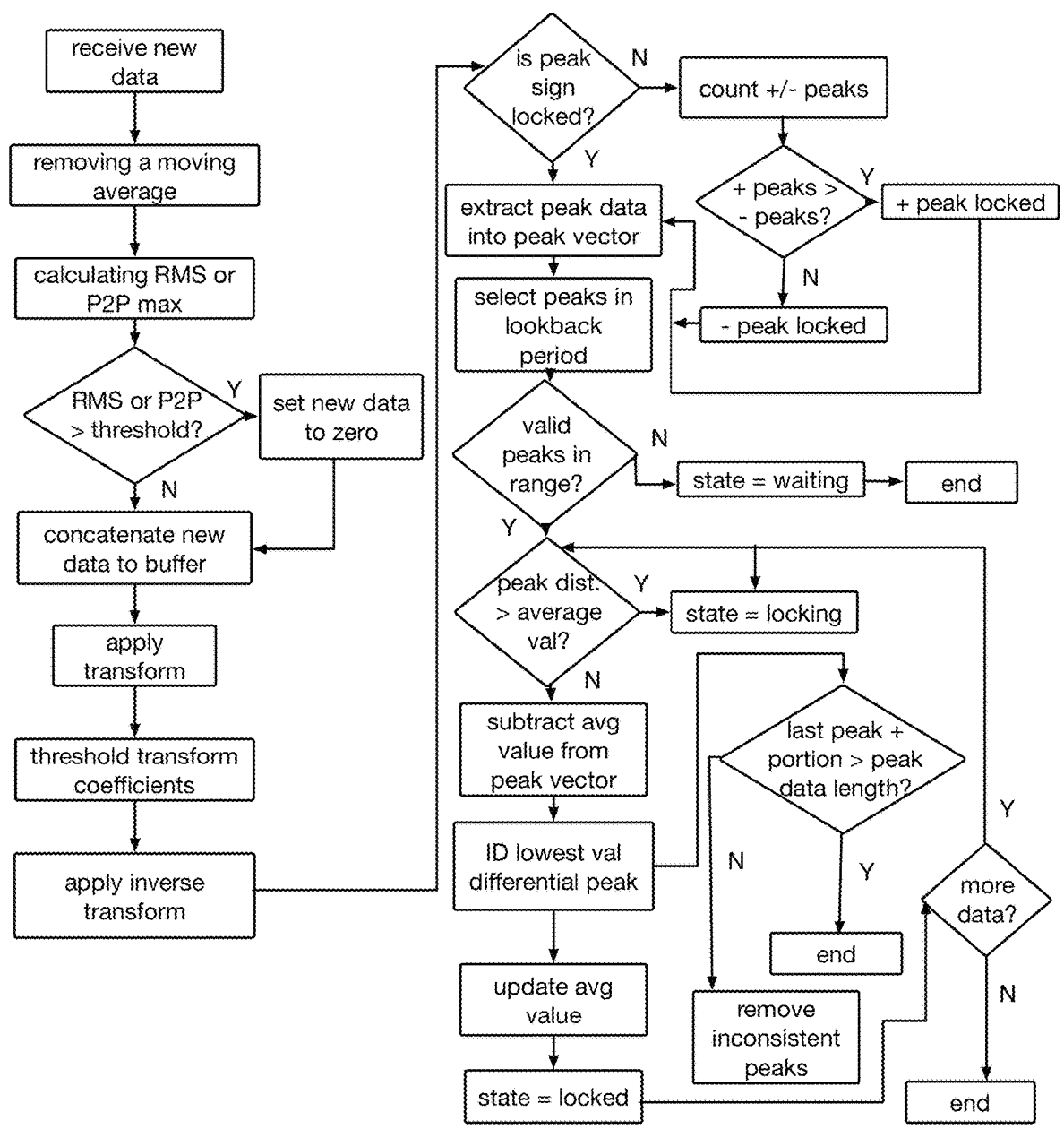
FIG. 14 depicts a flow chart of an embodiment of a portion of the method implemented by a specific example embodiment of the system.

A specific example implementation of the signal processing architecture, as shown in FIG. 14, can include: receiving new data (e.g., EEG signal data, ECG data extracted from EEG signal data, ECG data gathered directly from an ECG sensor, any other suitable time-varying signal data, etc.); removing a moving average of the new data; calculating the root mean squared (RMS) and maximum swing (e.g., peak-to-peak amplitude) of the new data; determining that the RMS and/or maximum swing values exceed a threshold; in response to the RMS and/or maximum swing values exceeding the threshold, transforming the new data to a zero value; concatenating the new data to a data buffer; applying a first transform (e.g., a discrete wavelet transform) to the data buffer to generate transformed data; thresholding the coefficients of the transformed data (e.g., setting coefficients of the transformed data that fall below a threshold to a zero value); applying an inverse transform (e.g., an inverse discrete wavelet transform) to generate filtered data; determining if the sign of the peak is locked; in response to determining that the peak sign is locked, extracting peak data into a peak vector; selecting peaks from the peak vector that are within a look back period; determining that selected peaks within the look back period are valid according to a set of validity criteria (e.g., within a valid amplitude range, within a valid frequency range, within the look back temporal range, etc.); setting the state of the system to a locking state, wherein the processing module is synchronized to the signals encoded by the received new data, based on the peak-to-peak distance (e.g., whether the peak-to-peak distance is greater than an R-R value moving average, a maximum threshold, etc.).

The above and related specific implementations can additionally or alternatively include, as shown in FIG. 14, in response to determining that the peak sign is not locked, counting positive and negative polarity peaks in the filtered data that exceed a threshold amplitude; determining whether there are a greater number of positive peaks or negative peaks, and determining that the signal is negative peak locked if there is a greater number of negative peaks and determining that the signal is positive peak locked if there is a greater number of positive peaks; in response to determining that there are no valid peaks according to the set of validity criteria, setting the state of the processing module to a waiting state and ending the processing loop; based on the peak-to-peak distance, subtracting a differential value (e.g., a R-R distance moving average value, a threshold value, etc.) from the peak vector to generate a differential peak vector; selecting a lowest differential peak value (e.g., having the highest expected value of validity, a largest expected value of recurrence, etc.) and determining that the selected lowest differential peak value added to a portion (e.g., 80%, one half, etc.) of an average value (e.g., an R-R distance moving average value), which together constitute a test value, is greater than a length of the peak data; eliminating inconsistent peaks based on the comparison between the length of the peak data and the test value to generate a modified differential peak vector; and updating the average value (e.g., the R-R moving average value) based on the modified differential peak vector.

The processing module can additionally or alternatively execute or be configured to: prefilter the data to remove offsets and signal drift, detect artifacts (eg. eye blinks, skin movements, muscle signals), classify and reverse these artifacts (eg. by independent components analysis), map surface signals to modelled internal sources (eg. by low-resolution tomography), quantify the strength and topography of network connectivity (eg, Granger Causality), measure nonlinearity or chaotic features (eg. Lyupanov dimensionality), measure frequency components (eg. Fourier Transform, time-frequency methods etc), or perform any other suitable EEG signal processing method to extract relevant features for development or evaluation of specific bioparameter models.

Additionally or alternatively, the processing module 252 can be configured in any suitable manner.

4.5.B Communications Module

As shown in FIG. 4B, the electronics subsystem 250 can include a communications module 254 functioning to receive and/or transmit data (e.g., a bioparameter, a cognitive state metric, a bioelectrical signal dataset, a combined audio signal and bioelectrical signal dataset, etc.) with a remote server, a user device, and/or any suitable component. The communication submodule preferably includes a transmitter, and can additionally or alternatively include a receiver. In a variation, the communication module can facilitate wired communication between the biomonitoring neuroheadset and another device (e.g., a smartphone of a user). In this variation, wired communication can be through a cable with connectivity for an audio jack, USB, mini-USB, lightning cable, and/or any suitable wired connection medium. In another variation, the communication module can facilitate wireless communication between the biomonitoring neuroheadset and another device. Wireless communication can be facilitated through Zigbee, Z-wave, WiFi, but can additionally or alternatively be facilitated through short-range wireless communication including Bluetooth, BLE beacon, RF, IR, or any other suitable wireless communication medium.

The communications module 254 is preferably configured to transmit any suitable dataset (e.g., a bioelectrical signal dataset, an audio signal dataset, a combined bioelectrical signal and audio signal dataset, etc.) to any suitable device. In a specific example, the communications module 254 can be configured to transmit the noise-reduced EEG dataset to the mobile computing device for transmission to a remote processing module 270, and/or to transmit the audio signal dataset to a mobile computing device of the user, wherein the audio signal dataset specifies instructions for controlling operation of the mobile computing device. However, the communications module 254 can be configured to perform any suitable operation.

The communication submodule can additionally or alternatively include a router (e.g., a WiFi router), an extender for one or more communication protocols, a communication protocol translator, or include any other suitable communication submodule. The communication submodule can also additionally or alternatively include or be communicatively coupled to RAMs, ROMs, flash memory, EEPROMs, optical devices (CD or DVD), hard drives, floppy drives, and/or any suitable data storage device However, the communication submodule can receive, convert, and/or transmit any type of suitable signal or data to any suitable component or device.

4.6 Speaker

The system 200 can include one or more speaker 260 of a biomonitoring neuroheadset. The speaker 260 functions to output audio. Output audio can be used to promote a therapy and/or facilitate physiological and/or psychological monitoring (e.g., a user response to the outputted audio) of the user. Output audio can additionally or alternatively be used to provide desired audio output to the user (e.g., play a song, act as a hands-free headset for a phone, etc.). Output audio can, however, have any other suitable purpose. The speaker 260 is preferably embedded with a biomonitoring neuroheadset. In particular, the speaker 260 is preferably embedded in an ear bud physically supported by the wearable support frame 240 and additionally housing portions one or more bioelectrical signal sensor 210. In a specific example, the system 200 can include a speaker 260 positioned proximal an EEG sensor 210 and an ear canal of the user. Additionally or alternatively, one or more speakers 260 can be positioned at any location in relation to components of the biomonitoring neuroheadset. However, the speaker 260 can be remote from the biomonitoring neuroheadset (e.g., a speaker 260 wirelessly communicating with the biomonitoring neuroheadset), or can otherwise be omitted from the system 200.

The speaker 260 is preferably controlled by the processing module 252 of the electronics subsystem 250, but can additionally or alternatively be controlled by any suitable component. The speaker 260 can be configured to emit audio samples generated by and/or transmitted by any suitable user device. In a specific example, the communications module 254 of the electronics subsystem 250 can be configured to receive from a mobile computing device an audio sample transmitted based on instructions extracted from a collected audio signal input of the user, where the speaker 260 can be configured to emit the audio sample.

In a variation, the one or more speakers 260 can be configured to emit one or more audio samples from which a user response can be measured (e.g., by a bioelectrical signal sensor 210, by a microphone 230). In a specific example, one or more EEG sensors 210 can be configured to collect a second EEG signal dataset (e.g., where a first EEG signal dataset was collected prior to emission of the audio sample) from the user during a time period in response to emission of the audio sample, and wherein one or more reference sensors are further configured to collect a second reference signal dataset (e.g., where the first reference signal dataset was collected prior to emission of the audio sample) from the user contemporaneously with collection of the second EEG signal dataset during the time period. In another specific example, repetitive stimuli are applied to the user (e.g., a beep or other suitable audible stimulus of 0.25 s duration at 800 Hz, repeated at 1.2 sec intervals) and the response is averaged over equivalent portions of the response relative to the onset of the stimulus (e.g., in a time-locked manner), to derive an evoked response signal (e.g., a bioelectrical signal dataset corresponding to an evoked response). In a related example, a proportion of the supplied audible stimuli have a differentiating property (e.g., a different pitch, such as 1100 Hz), and are used to generate a differential evoked response signal (e.g., averaged across the equivalent portions of the associated response to the stimuli having the differentiating property) separate from the evoked response signal corresponding to the audible stimuli not having the differentiating property (e.g., at the pitch of 800 Hz). The differential evoked response and the evoked response can be compared, and the comparison can be used to derive information about the user (e.g., cognitive processes utilized by the user, cognitive decline, fatigue, hearing acuity, etc.).

However, one or more speakers 260 can be configured in any suitable manner.

4.7 Supplemental Sensors

The system 200 can include one or more supplemental sensors, which function to collect supplemental data to aid in monitoring psychological (e.g., cognitive state metric) and/or physiological status (e.g., cardiovascular parameters, health status parameter, etc.) of a user. One or more supplemental sensors can include: motion sensors (e.g., accelerometers, gyroscopes), magnetometers, audio sensors, video sensors, location sensors, and/or any other suitable sensor. A supplemental sensor is preferably arranged at a suitable location of the biomonitoring neuroheadset, but can additionally or alternatively be positioned at any suitable location (e.g., as part of user device distinct from the biomonitoring neuroheadset, etc.). However, one or more supplemental sensors can be configured in any suitable manner.

In an example, one or more supplemental sensors can include a motion sensor configured to detect one or more user motion features indicating a user's gait, imbalance, tremors, exercise habits, counting steps, movement restrictions, and/or any other suitable user motion feature.

In another example, the supplemental sensors can include one or more cameras. The cameras can be mounted to the system (e.g., be pointed at the user, pointed at an external environment, etc.), mounted distal the system, or be otherwise arranged. The cameras can be stereoscopic, visible spectrum, invisible spectrum (e.g., IR), or be otherwise configured. In a specific example, images and/or video captured by the cameras can provide a feed of the current use environment and/or user motion (e.g., using optical flow, etc.), which can then be mapped against the EEG, audio and other bioparameters to provide contextual information and real time feedback that is dynamically suited to the situation.

User motion features and/or any suitable data collected by one or more supplemental sensors can be used with, combined with, and/or processed in any suitable manner with collected bioelectrical signal data and/or other suitable datasets in order to determine a bioparameter (e.g., cognitive state metric, cardiovascular parameter such as heart beat, etc.), control operation of a user device (e.g., detecting user gestural instructions such as nodding, head shaking, control taps on casing, head motion, body motion, facial expressions, etc.), and/or perform any other suitable operation in relation to the method 100. The supplemental data streams can additionally or alternatively be used to: verify the determined bioparameter, determine the bioparameter (e.g., a different version of the same bioparameter, using a different set of inputs and/or methodologies, wherein the best bioparameter value, such as the bioparameter value with the highest confidence level, can be selected from the set of potential bioparameter values), determine a backup bioparameter (e.g., when the primary data set, such as the EEG signals, are unavailable or have noise above a noise threshold), trigger subsequent analyses (e.g., trigger EEG signal sampling, trigger bioparameter verification or validation), or be used in any other sutiable manner. However, one or more supplemental sensors can be configured to perform any suitable operation.

The method 100 and/or system 200 of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a patient computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes (e.g., combinations of any suitable number of any of the variants and embodiments disclosed above) can be made to the embodiments of the invention without departing from the scope of this invention as defined in the following claims.

We claim:

1. An electroencephalogram (EEG) headset, comprising:
 a first and second earpiece, each earpiece comprising:
  an in-ear earbud, comprising a speaker and an EEG sensor; and
  an ear hook mounted to the earbud, comprising a common mode sensor vertically arranged relative to a driven right leg electrode, wherein the ear hook is configured to bias both the common mode sensor and the driven right leg electrode against skin proximal a mastoid process of a user; and
 a processing system connected to the first and second earpiece, the processing system configured to:
  generate a virtual reference signal, corresponding to a virtual reference location, from signals received from the common mode sensors; and
  determine a bioparameter for the user based on an EEG signal dataset received from at least one of the EEG sensor of the first earpiece or the EEG sensor of the second earpiece.

2. The EEG headset of claim 1, wherein at least one of the first or second earpieces further comprises an accelerometer.

3. The EEG headset of claim 1, wherein at least one of the first or second earpieces further comprises a microphone.

4. The EEG headset of claim 1, wherein the EEG signal dataset is referenced to the virtual reference signal.

5. The EEG headset of claim 1, wherein, for each earpiece, the ear hook comprises: a primary curvature forming a hook, wherein the common mode sensor and the driven right leg electrode each protrude from the primary curvature.

6. The EEG headset of claim 1, wherein, for each earpiece, the common mode sensor and the driven right leg electrode are configured to be positioned behind an ear flap of the user.

7. The EEG headset of claim 1, wherein the processing system comprises:
 a first processing subsystem connected to the first earbud; and
 a second processing subsystem mounted to the second earbud.

8. The EEG headset of claim 7, wherein one of the first or second processing subsystems comprises an averaging circuit configured to generate the virtual reference signal from the signals received from the common mode sensors in real time.

9. The EEG headset of claim 8, wherein the averaging circuit is configured to perform a weighted average of the signals to generate the virtual reference signal.

10. The EEG headset of claim 1, wherein the virtual reference location is located between the signals received from the common mode sensors in signal space.

* * * * *